(12) United States Patent
Holland et al.

(10) Patent No.: US 7,146,350 B2
(45) Date of Patent: Dec. 5, 2006

(54) STATIC AND DYNAMIC ASSESSMENT PROCEDURES

(75) Inventors: Paul Edward Holland, Fort Collins, CO (US); Mark William McDowell, Fort Collins, CO (US); Paul Laurence Dineen, Fort Collins, CO (US); Vu An Minh Le, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 593 days.

(21) Appl. No.: 10/353,874

(22) Filed: Jan. 29, 2003

(65) Prior Publication Data

US 2003/0140278 A1    Jul. 24, 2003

Related U.S. Application Data

(63) Continuation-in-part of application No. 09/851,963, filed on May 10, 2001.

(51) Int. Cl.
*G06N 5/02* (2006.01)

(52) U.S. Cl. .................. 706/47; 706/10; 706/60; 717/102; 717/103

(58) Field of Classification Search ............. 706/47, 706/10, 60; 717/102, 103
See application file for complete search history.

(56) References Cited

U.S. PATENT DOCUMENTS

| | | | |
|---|---|---|---|
| 4,949,278 A | 8/1990 | Davies et al. | |
| 5,131,087 A | 7/1992 | Warr | |
| 5,295,230 A | 3/1994 | Kung | |
| 5,644,686 A | 7/1997 | Hekmatpour | |
| 5,701,400 A | 12/1997 | Amado | |
| 5,715,373 A | 2/1998 | Desgrousilliers et al. | |
| 5,790,633 A | 8/1998 | Kinser, Jr. et al. | |
| 5,812,668 A | 9/1998 | Weber | |
| 5,813,009 A | 9/1998 | Johnson et al. | |
| 5,842,193 A | 11/1998 | Reilly | |
| 5,931,946 A | 8/1999 | Terada et al. | |
| 5,960,200 A * | 9/1999 | Eager et al. | 717/147 |
| 6,148,402 A | 11/2000 | Campbell | |
| 6,341,287 B1 * | 1/2002 | Sziklai et al. | 707/102 |
| 6,360,332 B1 | 3/2002 | Weinberg et al. | |
| 6,389,112 B1 | 5/2002 | Stewart et al. | |
| 6,427,230 B1 | 7/2002 | Goiffon et al. | |
| 6,442,714 B1 | 8/2002 | Griffin et al. | |
| 6,449,620 B1 | 9/2002 | Draper et al. | |
| 6,463,470 B1 | 10/2002 | Mohaban et al. | |
| 6,470,388 B1 | 10/2002 | Niemi et al. | |
| 6,477,575 B1 | 11/2002 | Koeppel et al. | |
| 6,502,102 B1 | 12/2002 | Haswell et al. | |
| 6,523,027 B1 * | 2/2003 | Underwood | 707/4 |

(Continued)

OTHER PUBLICATIONS

Miller et al; Web-based and Java-based simulation: Finding a substrate for federated components on the web; Proceedings of the 32nd conference on Winter simulation; Dec. 20.

(Continued)

*Primary Examiner*—Anthony Knight
*Assistant Examiner*—Sergey Datskovskiy

(57) ABSTRACT

An assessments framework includes a framework batch processor and a partner batch processor. The framework batch processor performs static assessments based on information obtained from a task definition database and a policy database. The partner batch processor outputs dynamic task definitions and dynamic policy information, to be input to the framework batch processor for executing an assessment when a triggering event occurs. The triggering event may be a schedule-based trigger or an event-based trigger.

18 Claims, 30 Drawing Sheets

U.S. PATENT DOCUMENTS

| | | | |
|---|---|---|---|
| 6,574,621 B1 | 6/2003 | Lautzenheiser et al. | |
| 6,577,711 B1 | 6/2003 | Williamson et al. | |
| 6,601,233 B1 * | 7/2003 | Underwood | 717/102 |
| 6,662,357 B1 * | 12/2003 | Bowman-Amuah | 717/120 |
| 6,701,514 B1 * | 3/2004 | Haswell et al. | 717/115 |
| 6,732,090 B1 | 5/2004 | Shanahan et al. | |
| 6,748,451 B1 | 6/2004 | Woods et al. | |
| 6,757,357 B1 | 6/2004 | Horton et al. | |
| 6,778,979 B1 | 8/2004 | Grefenstette et al. | |
| 6,785,683 B1 | 8/2004 | Zodik et al. | |
| 6,851,108 B1 | 2/2005 | Syme et al. | |
| 2002/0013782 A1 | 1/2002 | Ostroff et al. | |
| 2002/0046099 A1 | 4/2002 | Frengut et al. | |
| 2002/0080938 A1 | 6/2002 | Alexander et al. | |
| 2002/0095399 A1 | 7/2002 | Devine et al. | |
| 2002/0099829 A1 | 7/2002 | Richards et al. | |
| 2002/0122054 A1 | 9/2002 | Hind et al. | |
| 2002/0147746 A1 | 10/2002 | Lee | |
| 2002/0169975 A1 | 11/2002 | Good | |
| 2002/0174082 A1 | 11/2002 | Miloushev et al. | |
| 2002/0176377 A1 * | 11/2002 | Hamilton | 370/328 |
| 2003/0154177 A1 | 8/2003 | Holland et al. | |
| 2003/0177106 A1 | 9/2003 | Brandon et al. | |
| 2003/0200172 A1 * | 10/2003 | Randle et al. | 705/39 |

OTHER PUBLICATIONS

Atansova et al; Distributed hetergeneous knowledge data base for control system design; multiagent development and support; proceedings of the 2000 IEEE International Symposiu.

Buhler et al; Remote fieldbus system management with Java and XML; Proceedings of the 2000 IEEE International Symposium on Industrial Electronics; ISIE 2000; vol. 1; Dec. 4-8.

Bichler et al; Component-based e-commerce: assessment of current practices and future directions; ACM SIGMOD Record; vol. 27 Iss. 4; Dec. 1998; pp. 7-14.

Jeff Ryan; "Building Modular Stylesheeet Components"; www.developer.com/xml/article.php/1477781; Oct. 7, 2002; pp. 1-6.

* cited by examiner

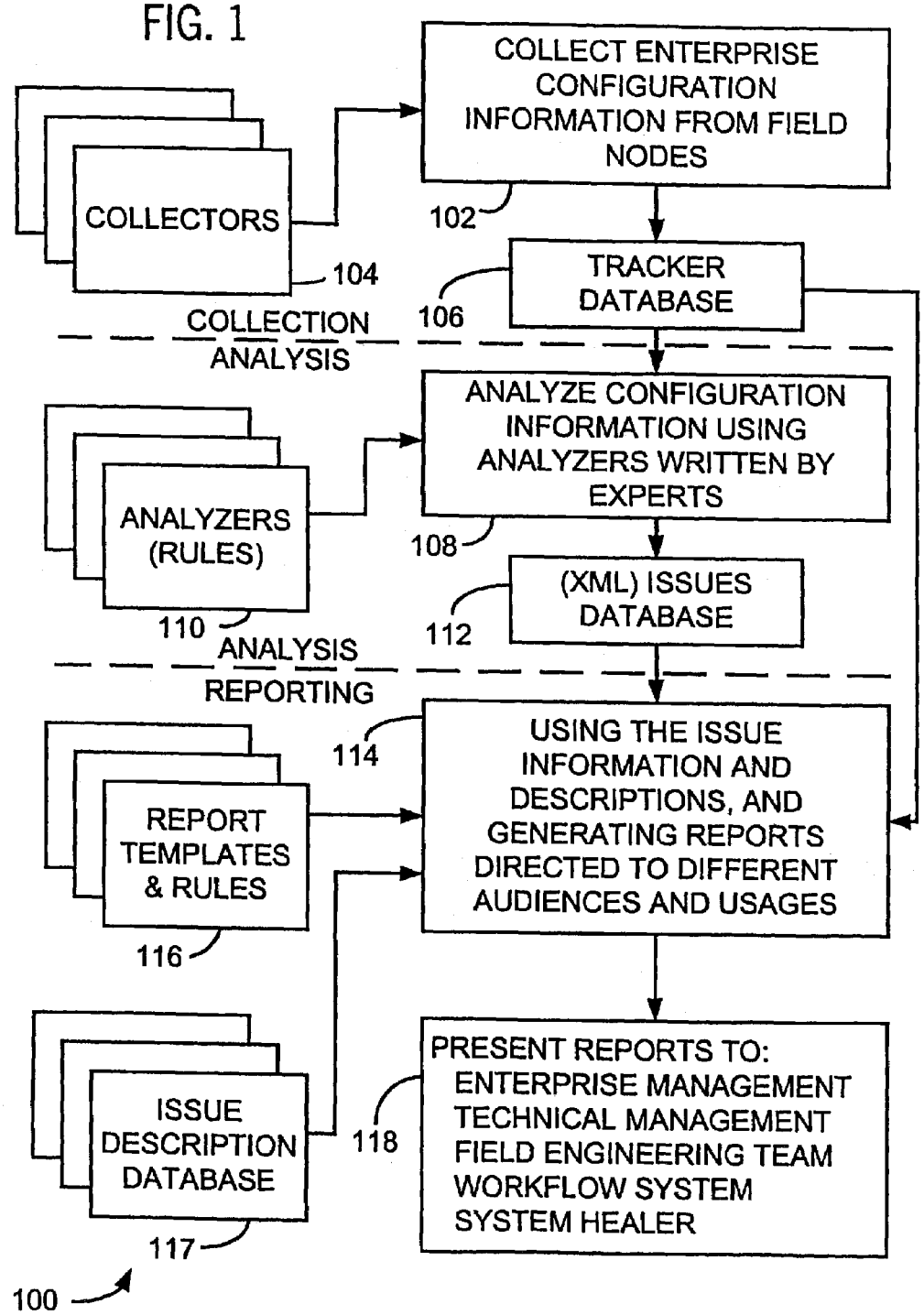

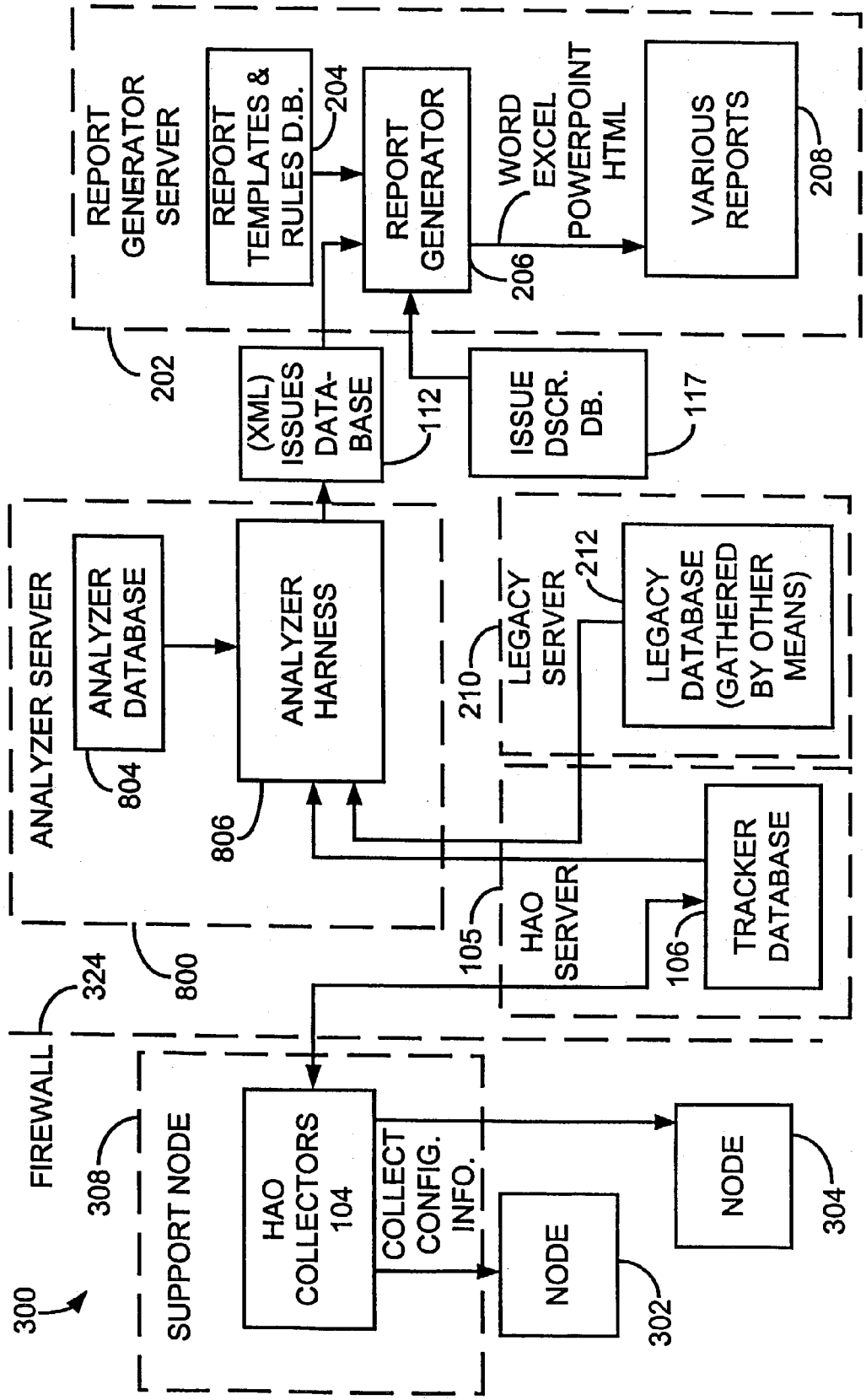
FIG. 2 ENTERPRISE LINKED TO ANALYZER AND REPORT GENERATOR

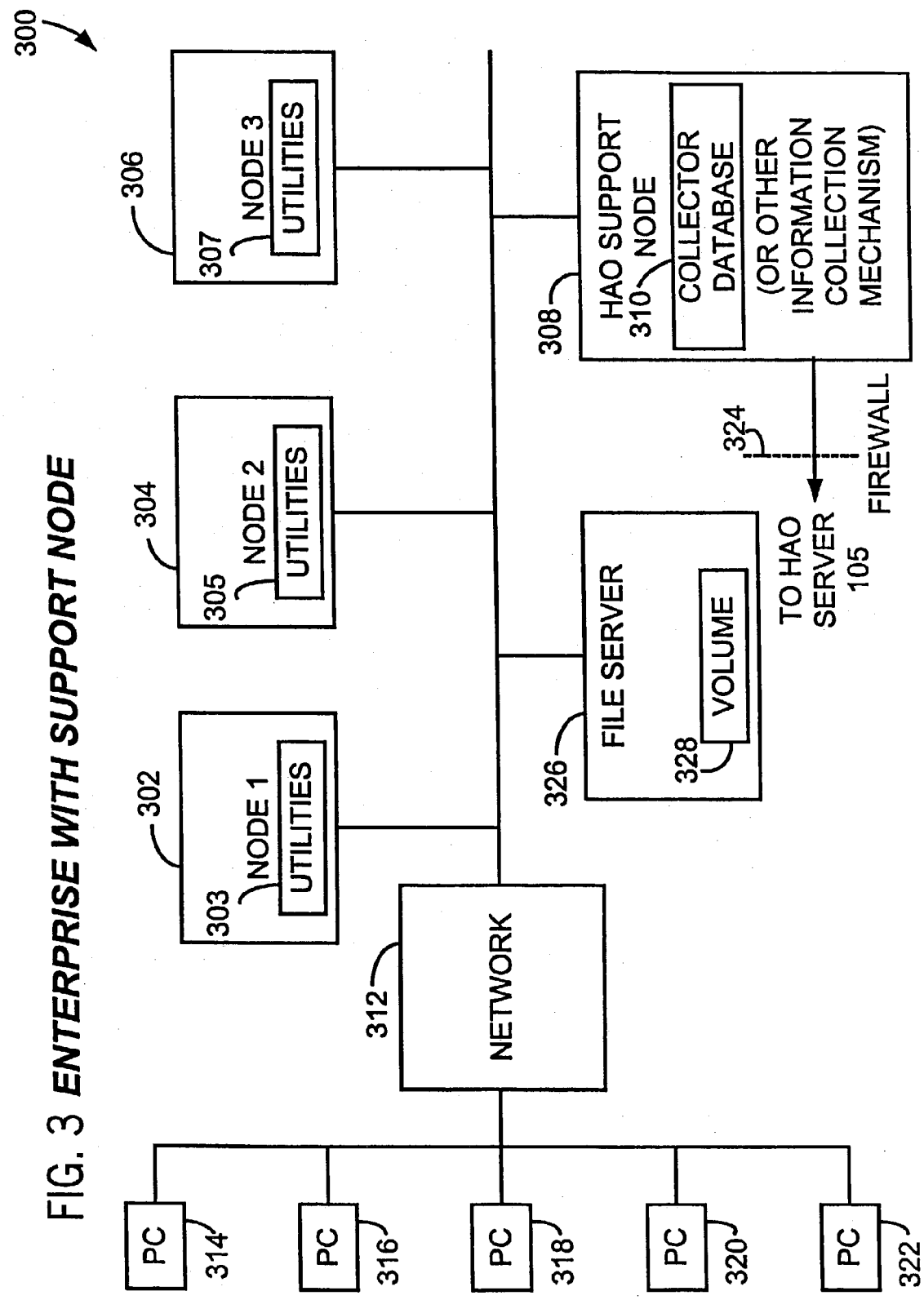

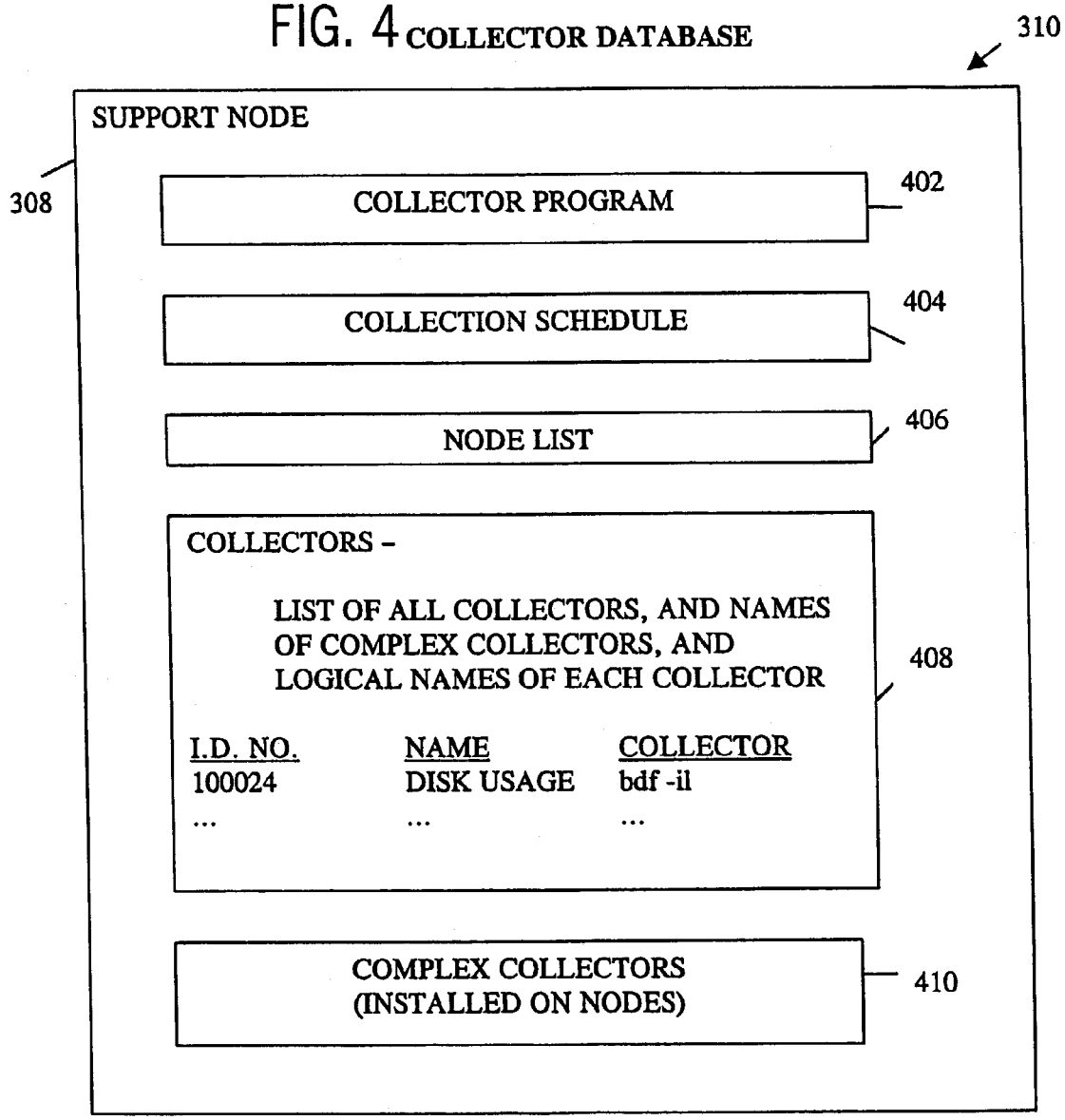

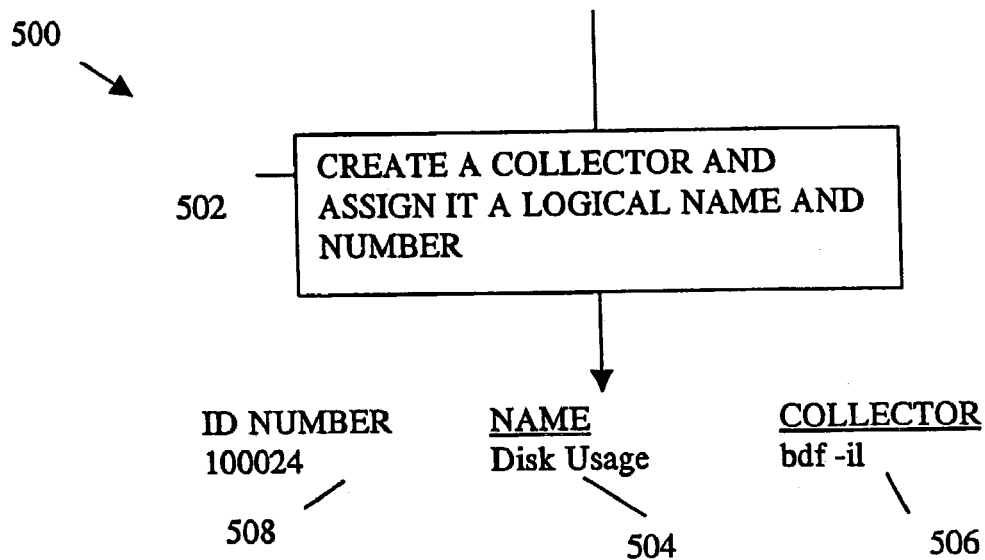
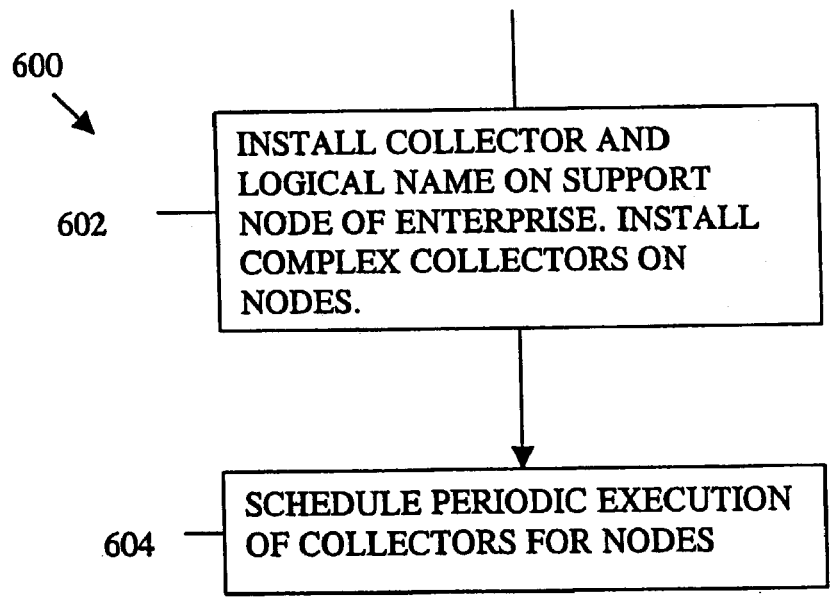

FIG. 7 ENTERPRISE COLLECTOR EXECUTION
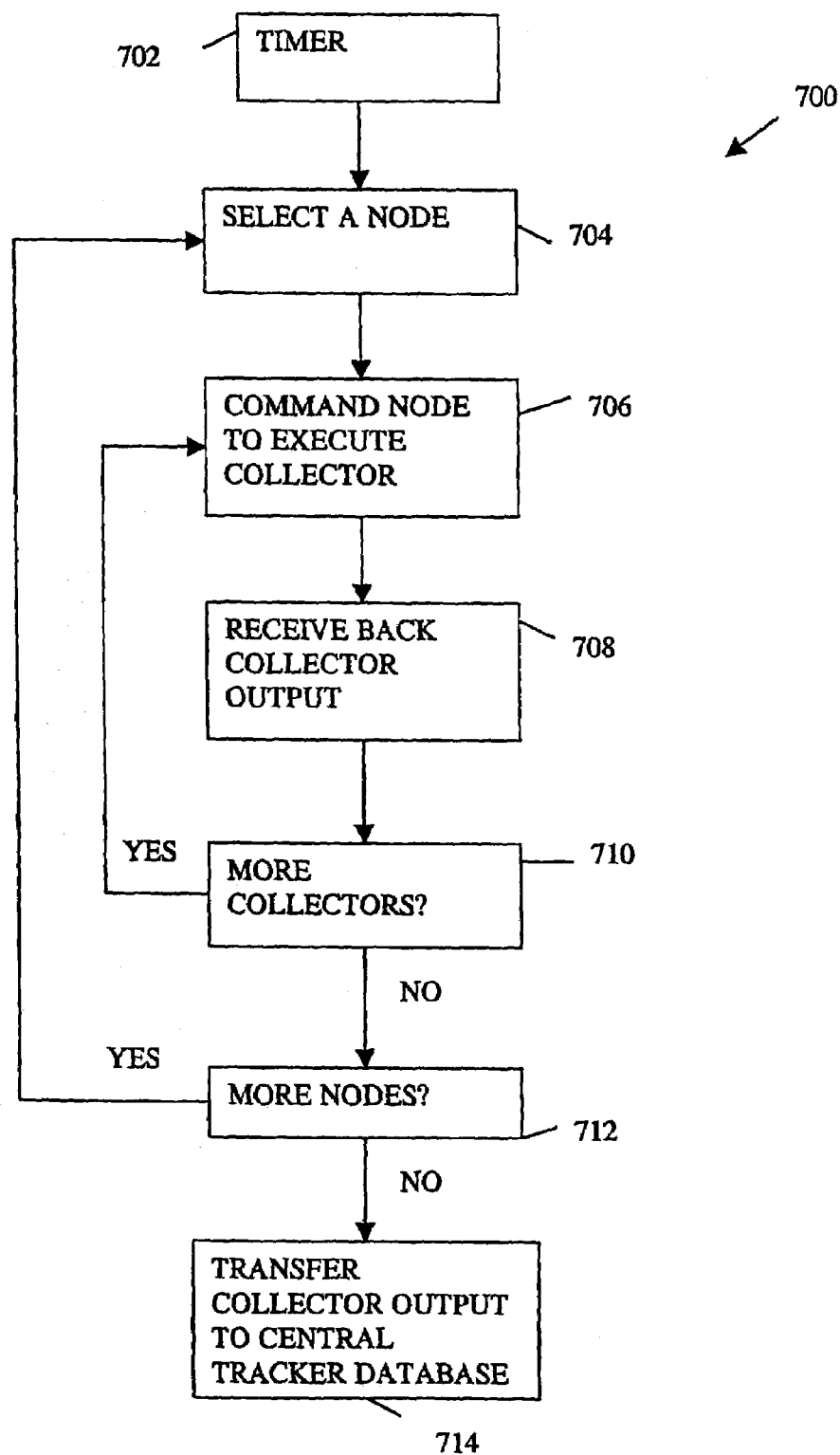

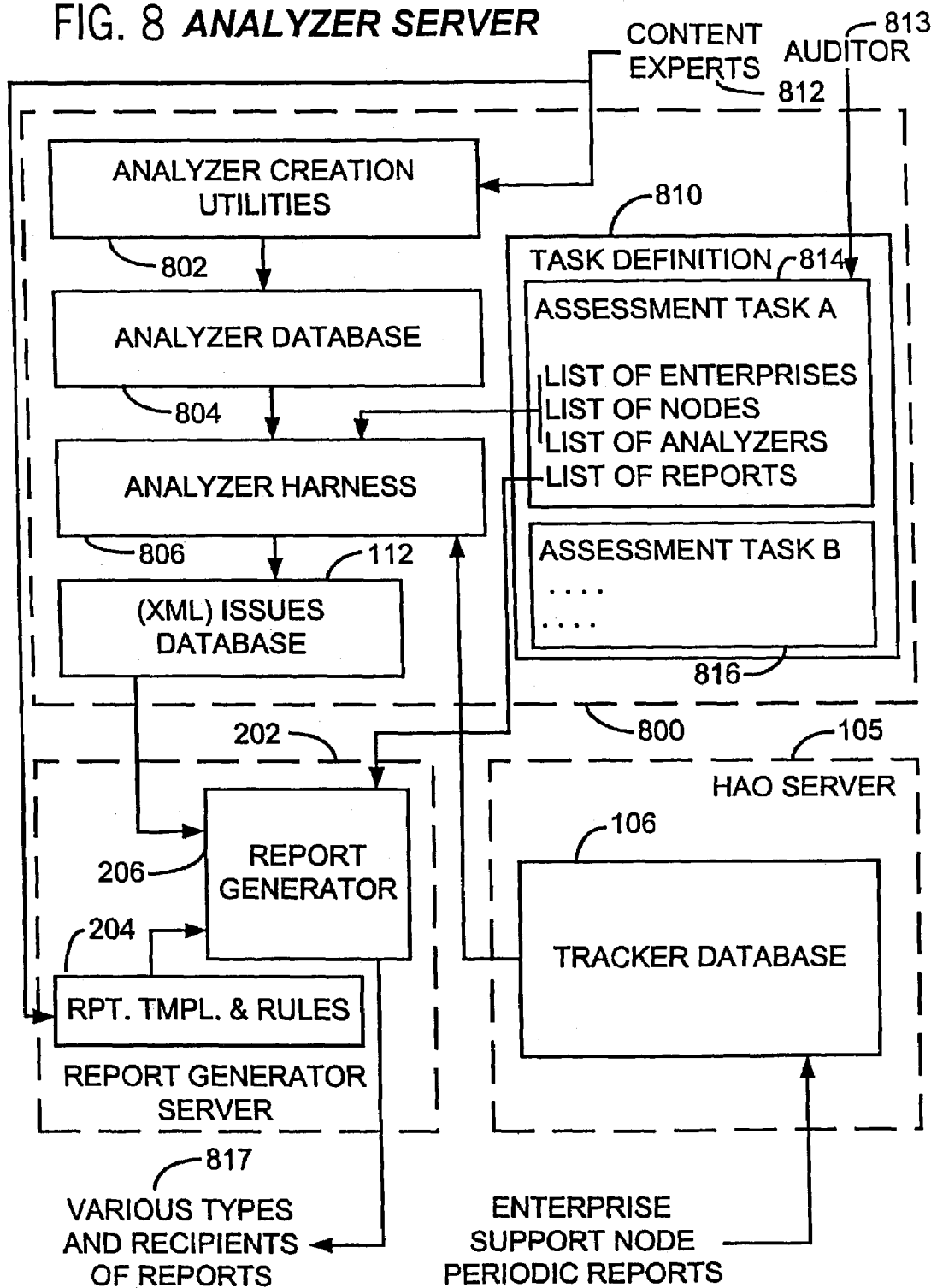

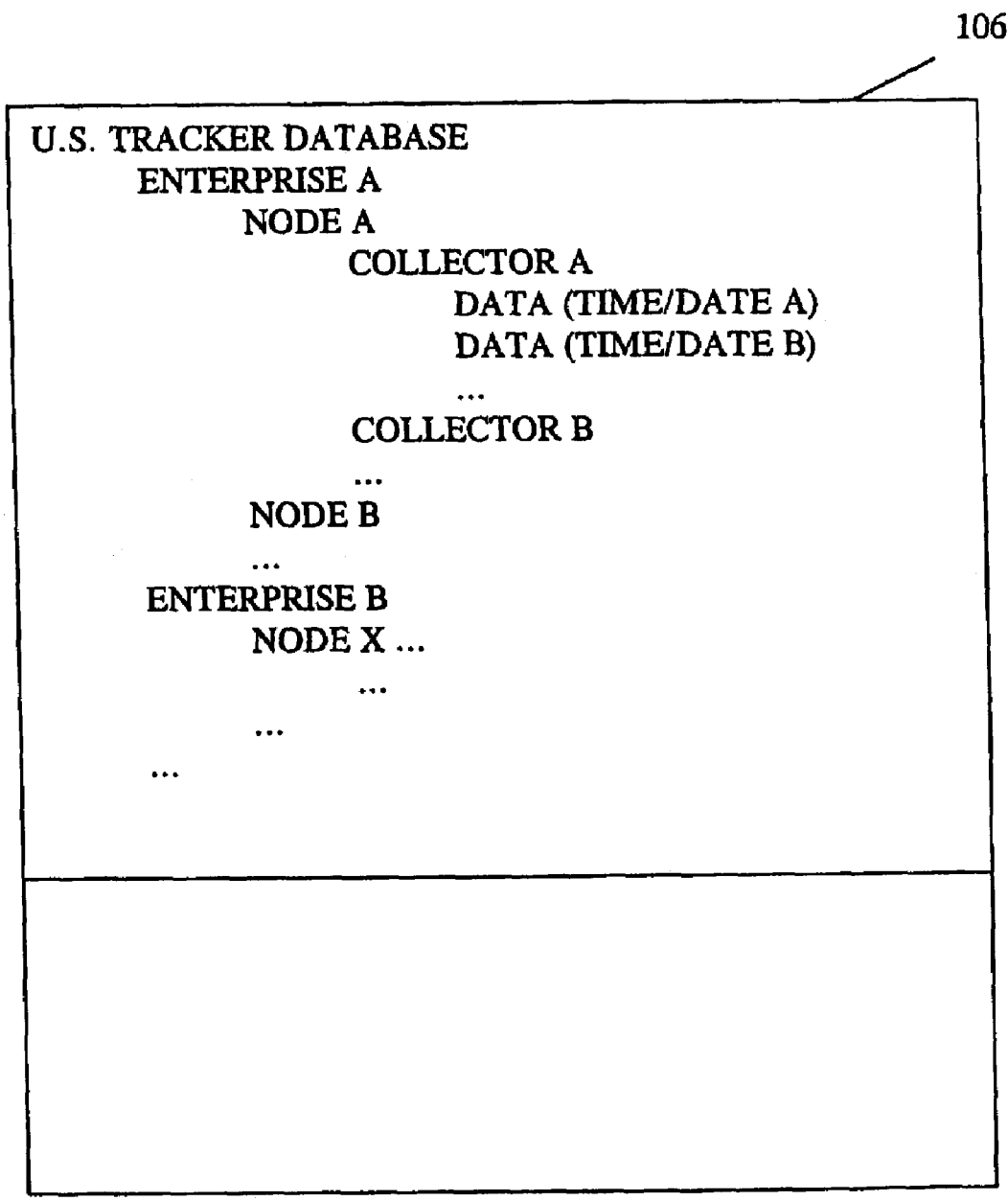
FIG. 9 TRACKER DATABASE

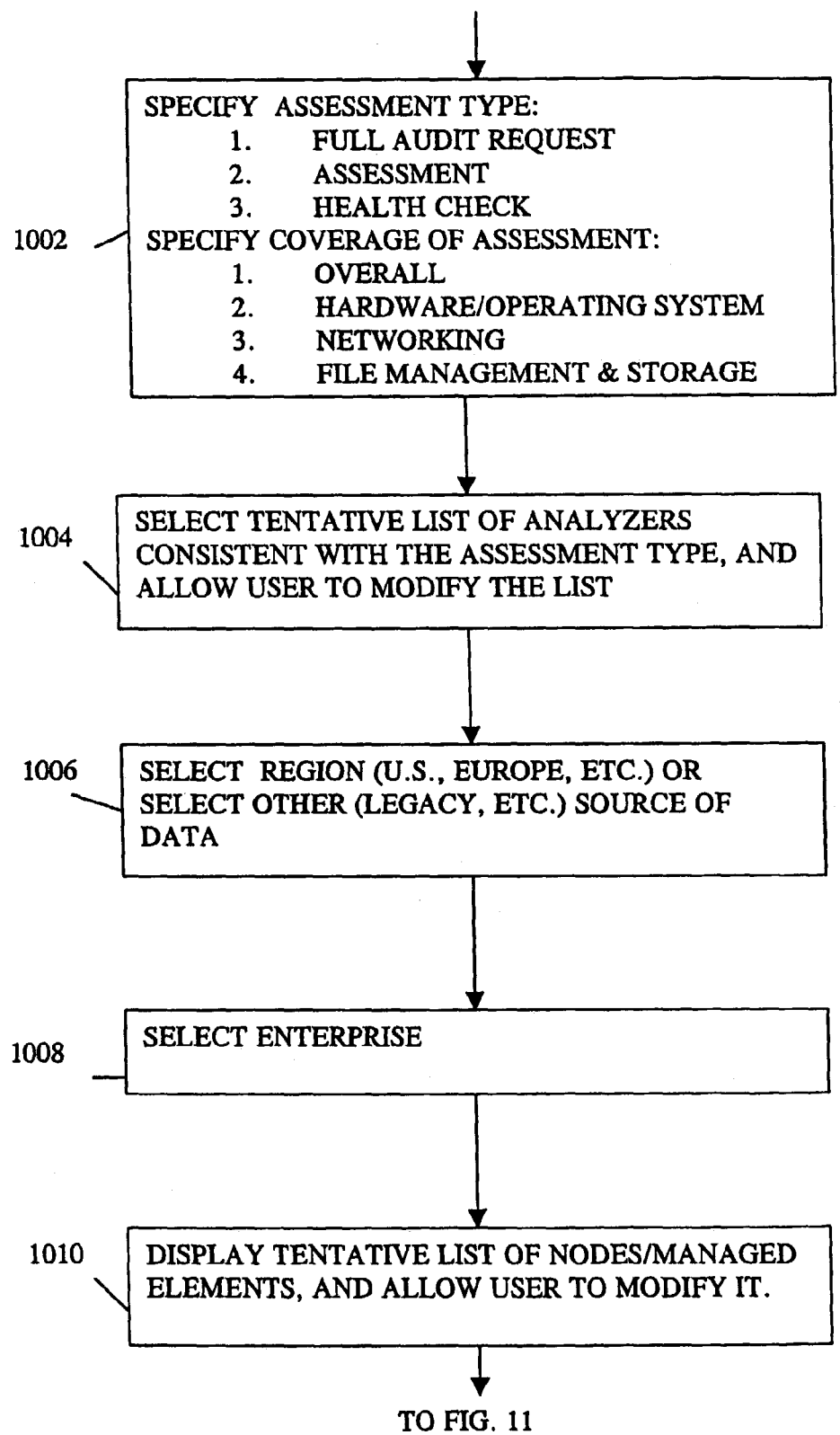
FIG. 10 TASK DEFINITION

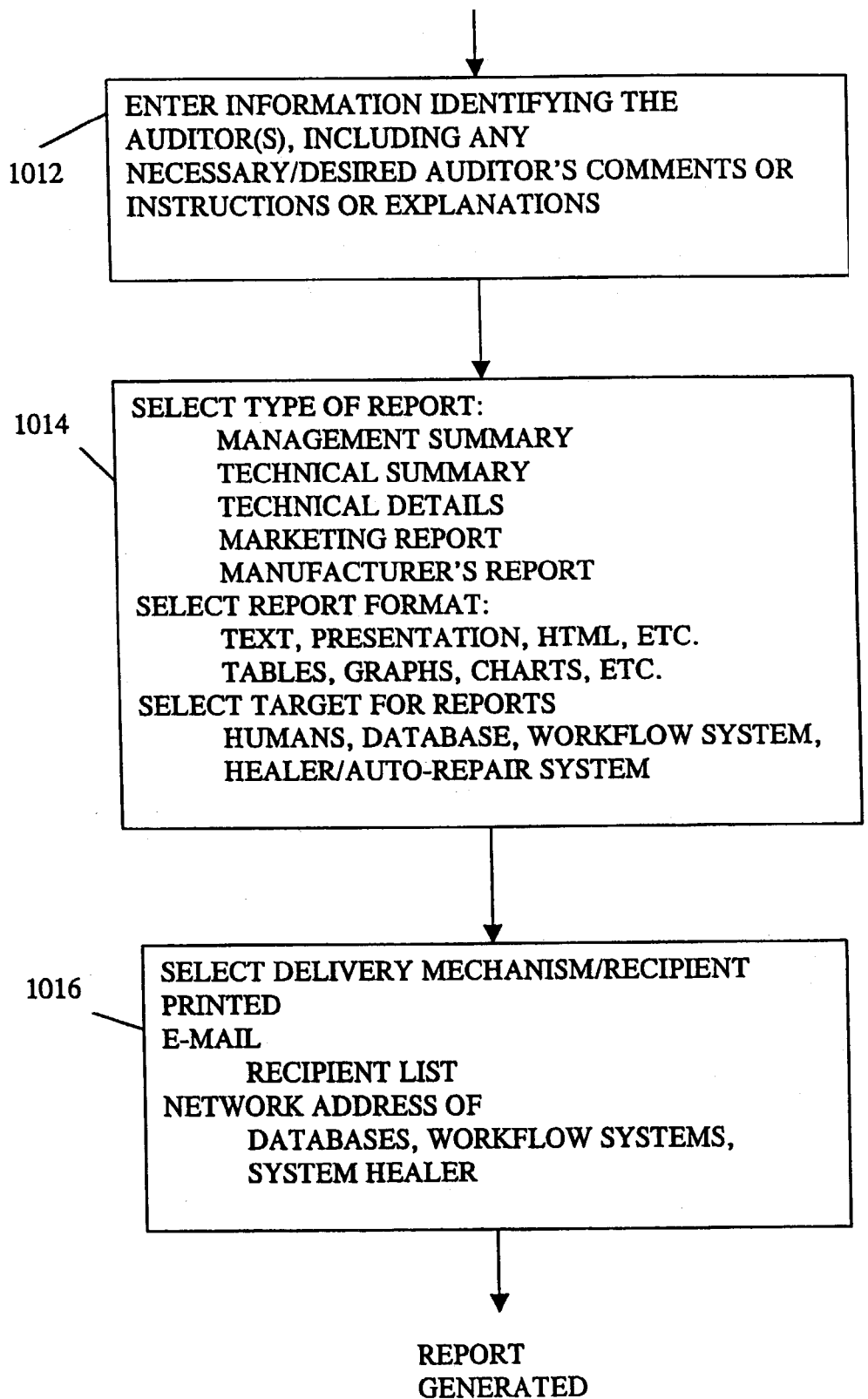
FIG. 11 REPORT DEFINITION

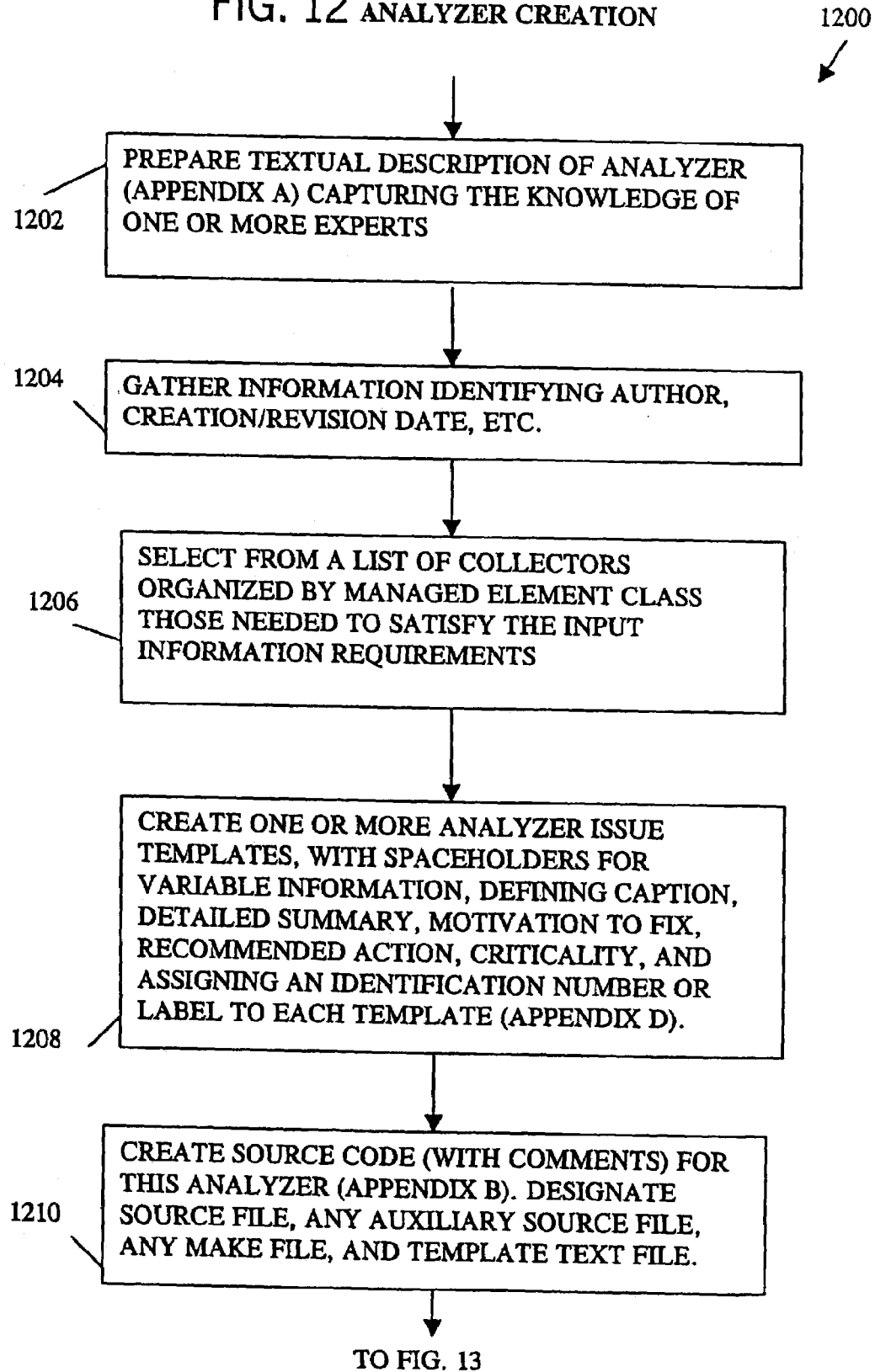
FIG. 12 ANALYZER CREATION

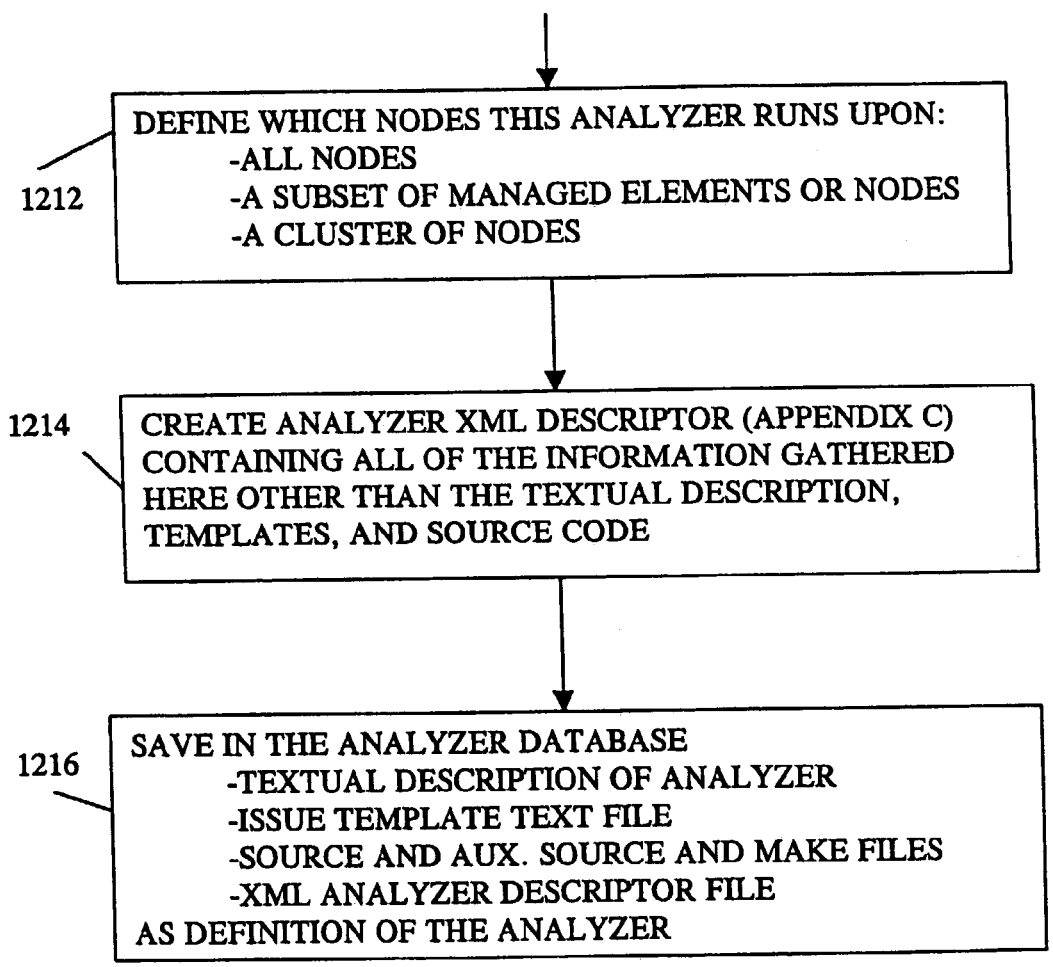
FIG. 13 ANALYZER CREATION (CONT.)

FIG. 14 ANALYZER CREATION USER INTERFACE
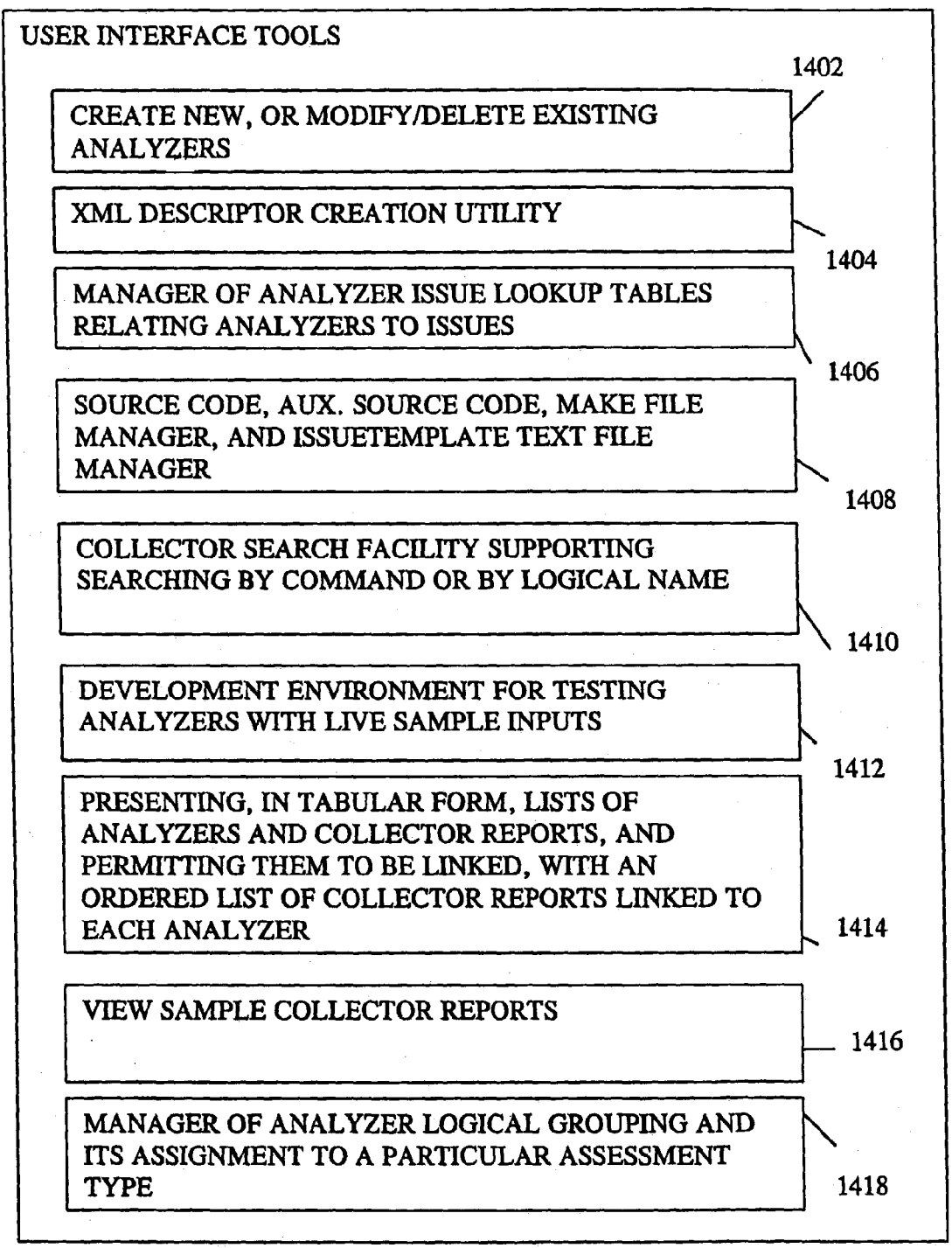

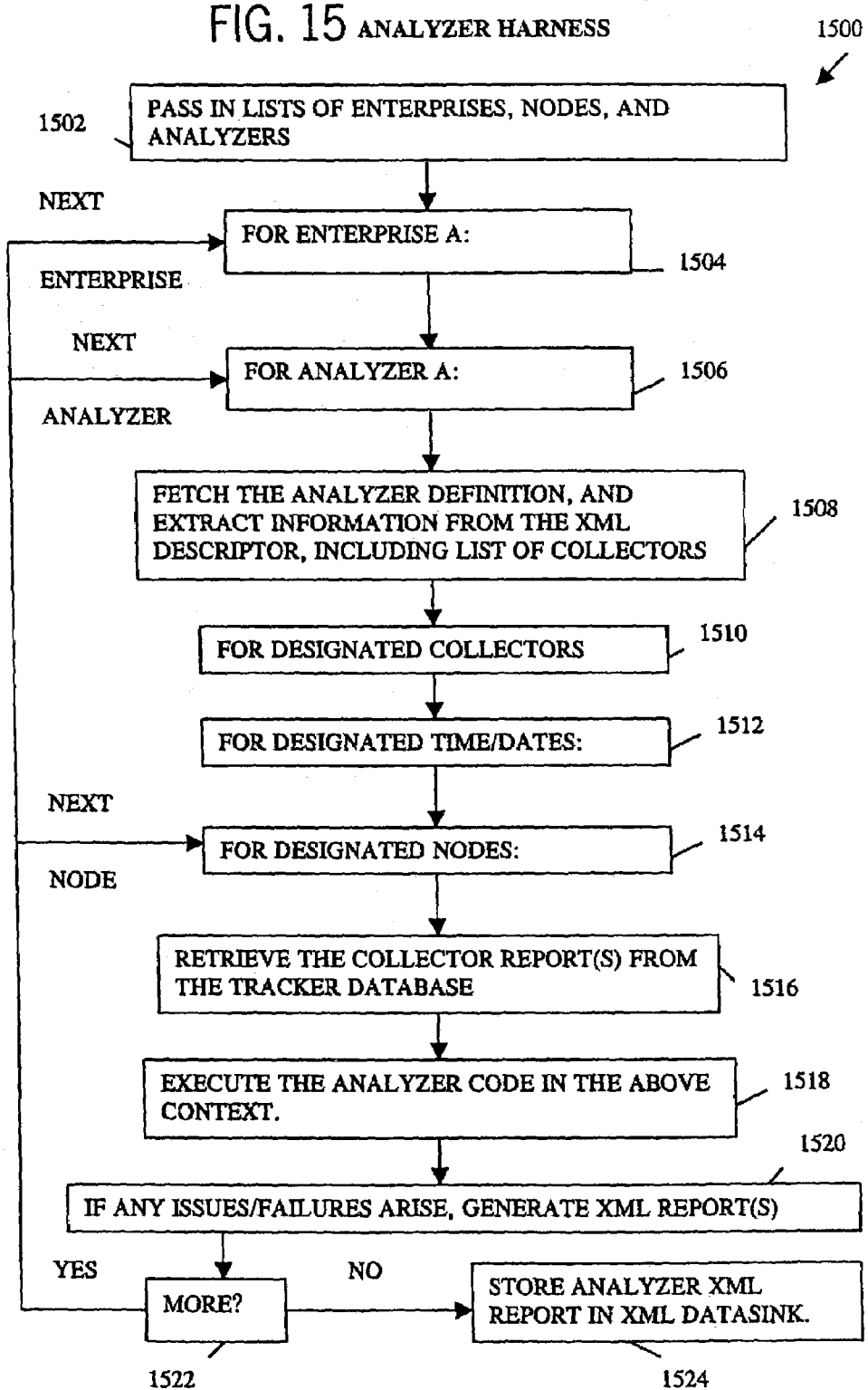

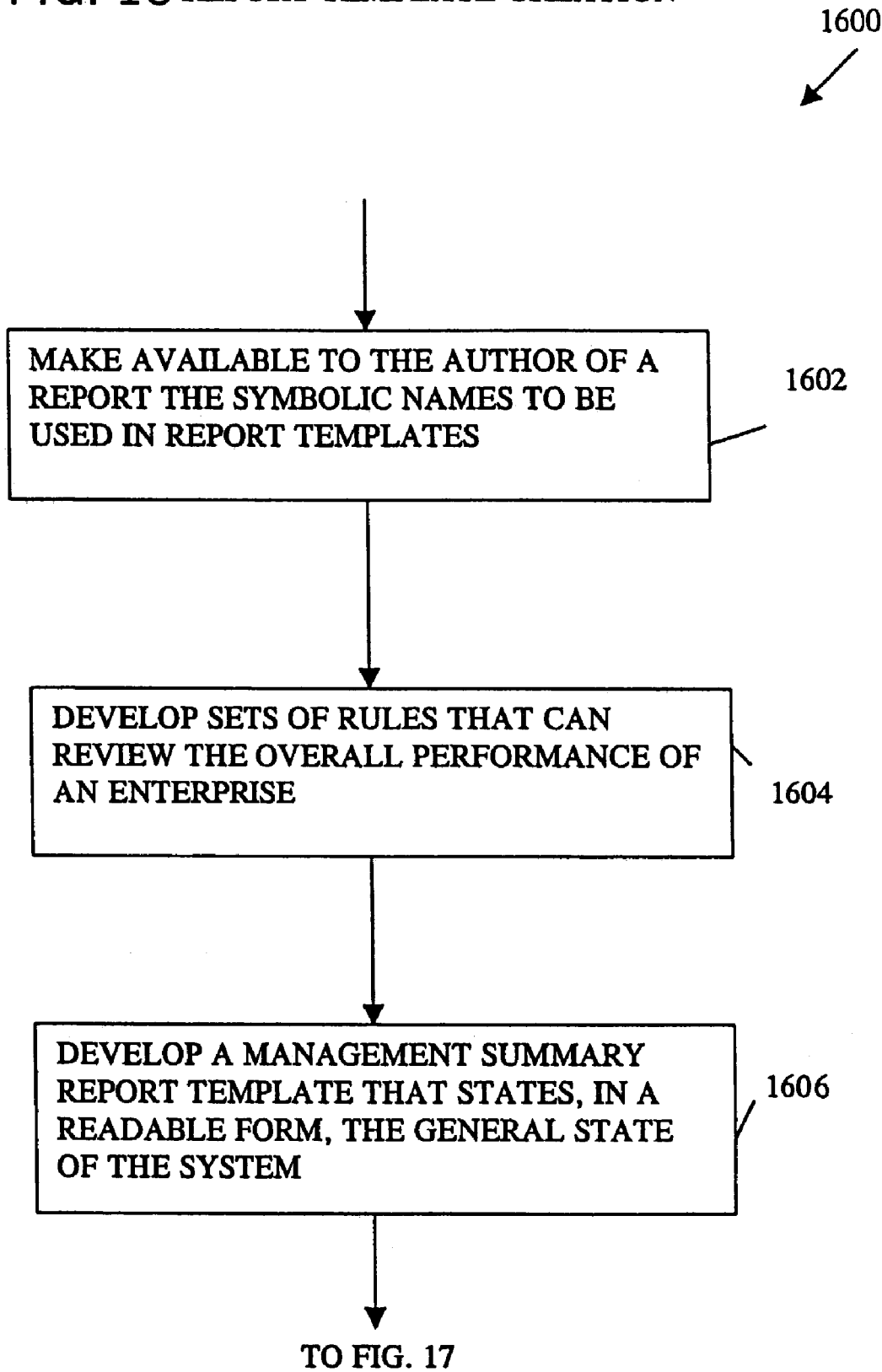

FIG. 17

FROM FIG. 16

1608 — DEVELOP A TECHNICAL MANAGEMENT SUMMARY REPORT THAT LISTS CRITICAL POINTS IN SUMMARY FORM, STATES THEIR DEGREE OF CRITICALITY, AND PRESENTS EXPLANATIONS AND COST ESTIMATES.

1610 — DEVELOP A TECHNICAL DETAIL TEMPLATE WHICH PRESENTS THE SPECIFIC ISSUES FOR EACH OF THE NODES OR GROUPS OF NODES. INCLUDE ANY MOTIVATIONS TO FIX EACH ISSUE, THE COST TO IMPLEMENT CHANGES, THE DETAILS OF EACH ISSUE, AND ANY SUPPORTING TEXT OR SNIPPETS OF THE COLLECTOR OUTPUT AS NEEDED TO CLARIFY AN ISSUE.

FROM FIG. 17

1612

DEVELOP A VARIETY OF MASTER REPORT TEMPLATES INTENDED FOR DIFFERING AUDIENCES AND BUSINESS NEEDS INCLUDING VARYING COMBINATIONS OF THE ABOVE REPORTS AS WELL AS ADDITIONAL INTRODUCTORY AND EXPLANATORY INFORMATION TO PLACE THE REPORTS IN CONTEXT.

IN ADDITION, THE USER OF THE REPORT GENERATOR MY PRODUCE ANY REPORT THAT IS NECESSARY OR DESIRABLE, COMBINING THE AVAILABLE INFORMATION IN ANY WAY THAT MAKES SENSE, GIVEN THEIR NEEDS.

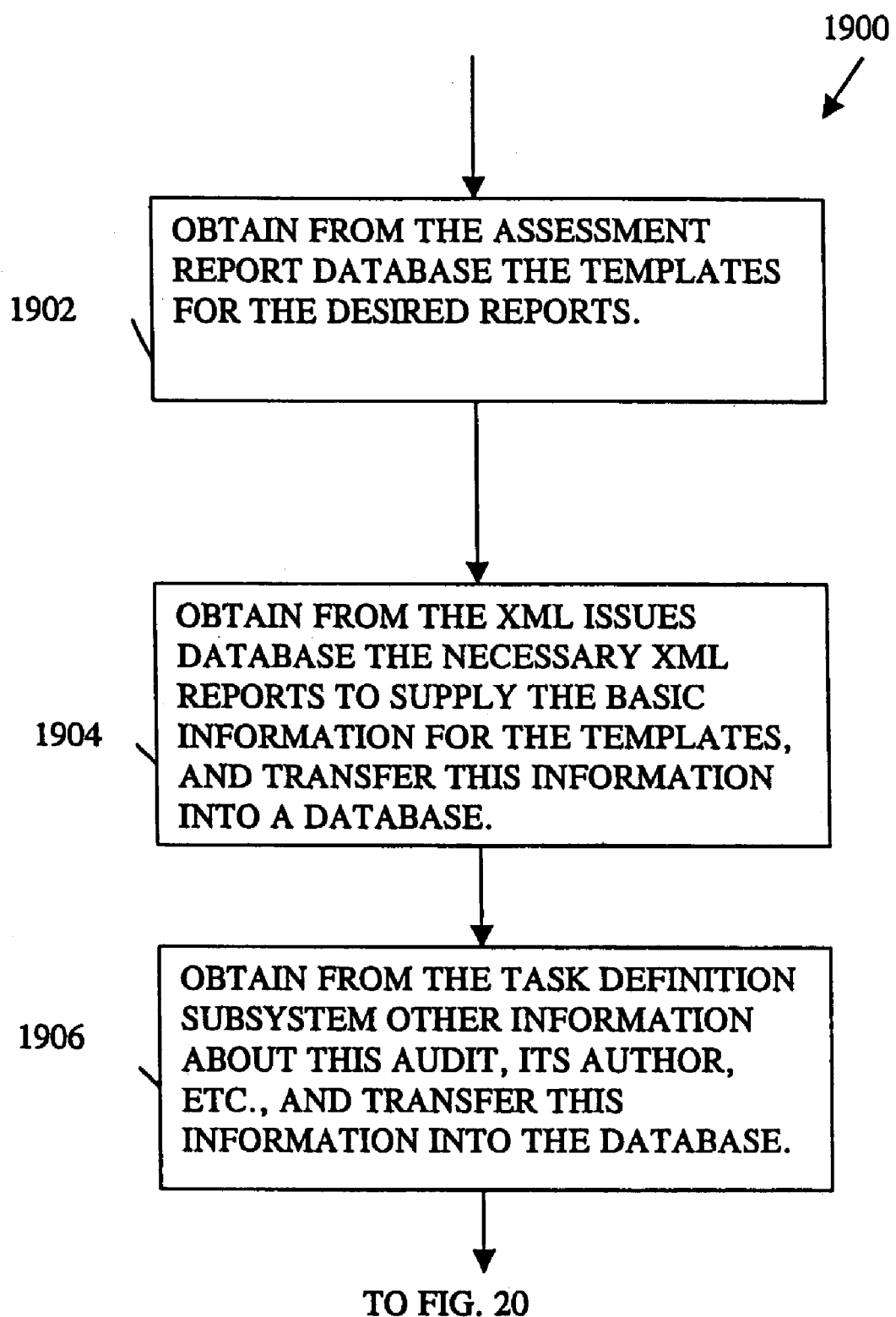
FIG. 19 REPORT GENERATOR

FIG. 20

FROM FIG. 19

1908 — OBTAIN FROM THE TRACKER DATABASE BACKGROUND INFORMATION ON THE SPECIFIC ENTERPRISE BEING AUDITED FOR INCLUSION IN THE REPORT AND PLACE IT IN THE DATABASE.

1910 — USING THIRD PARTY PROGRAM AS A TEMPLATE, GENERATE THE REPORTS.

CONCEPTUAL ASSESSMENT XML HIERARCHY

FIG. 27 -- ANALYZERS

FIG. 28 -- ANALYZERS (CONT.)

```
<?xml version="1.0"?>
<policy version="1.0" name="techasmts">
  <data-services>
    <data-service>
      <class>com.hp.esso.rstl.tsa.analysis.Audit</class>
      <properties/>
    </data-service>
    <data-service>
      <class>com.hp.esso.rstl.tsa.reporting.DataReporter</class>
      <properties/>
        <xsl-script>
          http://localhost/RST_Assessments/report.xsl
        </xsl-script>
      </properties/>
    </data-service>
  </data-services>
</policy>
```

Figure 31

```
<?xml version="1.0"?>
<audit-type version="1.0" name="HP-UX Hardware/Operating System">
  <caption>Overall assessment of the HP-UX hardware and operating system.</caption>
  <submitter>peter_howell@vendor.com</submitter>
  <policy>techasmts</policy>
  <analysis-set>
    <key>Diagnostics</key>
    <key>DiskAndArrays</key>
        •
        •
        •
  </analysis-set>
</audit-type>
```

Figure 32

```xml
<?xml version="1.0"?>
<policy version="1.0" name="TechnicalAssessments">
   <data-service>
      <class>com.hp.esso.rstl.tsa.analysis.Audit</class>
      <properties/>
   </data-service>
   <data-service>
      <class>com.hp.esso.rstl.tsa.exec.ObservationsDataService</class>
      <properties/>
   </data-service>
   <data-service>
      <class>com.hp.esso.rstl.tsa.exec.SummaryDataService</class>
      <properties/>
   </data-service>
   <data-service>
      <class>com.hp.esso.rstl.tsa.exec.SystemElementsInfoDataService</class>
      <properties/>
   </data-service>
   <data-service>
      <class>com.hp.esso.rstl.tsa.reporting.ReportDataSink</class>
      <properties/>
        <property>
           <name>report-type</name>
           <value><! [CDATA[Microsoft Word Report & Text Report]] ></value>
        </property>
      </properties>
   </data-service>
</policy>
```

STATIC AND DYNAMIC ASSESSMENT PROCEDURES

CROSS-REFERENCE TO RELATED PATENT APPLICATIONS

This application is a continuation-in-part of application Ser. No. 09/851,963 filed on May 10, 2001, entitled "A Method and System for Auditing an Enterprise Configuration," which application is assigned to the same assignee as this application, and which application is incorporated in its entirety herein by reference, including its appendices which are not reproduced in this application. (All citations below to the appendices A through H are references to the appendices A through H appearing in the above application.)

This application is may also describe subject matter that overlaps with the following continuation applications of Ser. No. 09/851,963: U.S. patent application Ser. No. 10/152,214 filed May 21, 2002 entitled "Appartus And Method For Analysis Driven Issue Report Generation"; U.S. patent application Ser. No. 10/152,556 filed May 21, 2002 entitled "Apparatus And Method For Capturing Knowledge Through An Expert Interface"; U.S. patent application Ser. No. 10/151,802 filed May 21, 2002 entitled "Method And Apparatus For Automatic System Configuration Analysis Using Descriptors Of Analyzers"; and U.S. patent application Ser. No. 10/372,475 filed Feb. 21, 2003 entitled "Automating Expert Knowledge With Analyzer Harness."

FIELD OF THE INVENTION

The present invention relates generally to the field of auditing a configuration of an enterprise.

BACKGROUND OF THE INVENTION

The core business of companies today is more and more dependent on information technology ("IT") services. As such, the impact of outages or interruptions in service is more and more significant. Businesses therefore require continuous operation of an infrastructure or system. Because of this requirement, an infrastructure that is "always on" is becoming the norm rather than the exception. The technology underlying that infrastructure must be configured to maintain continuous and optimal operation (configured "always right") of that infrastructure.

To obtain optimal configuration, a company may desire to perform an audit of the configuration of its infrastructure. The infrastructure may, for example, include a cluster configuration consisting of three nodes. In general, a cluster configuration is a group of nodes that are arranged to "back up" and substitute for the execution of a program in the event a node is unable to execute that program or the node is unavailable. This company may perform the audit or may typically hire an outside company firm to perform the audit. In this example, the audit usually involves the following five steps:

Resources—finding someone with the right skill level to do this system configuration audit.
Configuration—looking at a complex enterprise configuration either directly or by collecting all the relevant configuration information needed for the investigation.
Analysis—coming to conclusions.
Reporting—documenting the findings and presenting this information to a company requesting the audit.
Action Plan—creating an action plan to address the issues found.

Unfortunately, there are several issues or problems along the way that need to be overcome to make a successful audit.

Resources. A company must find the right personnel. To audit a system configuration a person requires practical experience with the underlying technology. The successful candidate must have sufficient technical and professional skills along with practical experience. Typically, no single person possesses expertise in all required areas. Time and money constraints limit the number of resources on an audit activity, limiting in turn the content of the delivery (depth, breath, . . . ) and also the quality. The audit may come to a halt if multiple people decide to change jobs. High turnover usually translates into a knowledge drain unless such knowledge is documented. In the event of a departure, a company must invest in training which is time consuming. This is no guarantee that the company actually captured the knowledge and expertise of the departing employee. This knowledge is an asset to the company that is lost forever. Not only must this knowledge be captured and kept, but it must also be utilized effectively. It must be accessible, and automatic access is highly desirable.

Configuration. The next issue concerns how to obtain the configuration information. In some circumstances the information has been previously obtained. However, this configuration information may likely be in a format unusable for analysis. In the absence of this information, it must be retrieved. In the event the audit is being performed by an outside company, manual interaction with a customer's system should be avoided even if the customer permits access. There is a risk that the interaction may cause a problem with the customer's platform. The customer will likely blame the outside company for problems with the system regardless of fault.

Today, there are software tools available for the collection of configuration information If such a tool was developed locally, reliability and maintenance is a concern largely because such tools are incomplete when they are developed. Also, the quality of a local tool will be limited by the local expertise.

The tools described require installation on a customer system which may make the system unavailable or may cause it to crash In addition, the customer may challenge the reason why he/she requires the tool to be installed on his/her systems. Customers with rigid change management in place will not allow the installation of any tools on short notice.

Analysis. Even if one is successful collecting configuration information, there are other obstacles. The analysis performed at the customer site will likely require multiple visits. This is valuable time lost. In addition, there are typically limited available resources on-site. Further, analysis typically requires the application of several analyzers to identify issues. Then there is the question of what parts of the node must be checked or analyzed and what issues should be identified. Both questions are typically answered by a single individual. Because of the limited knowledge of that individual, the system checks and issues identified may not be fully exhaustive. It is important, however, to rely on a well defined list of items to be checked and criteria of satisfaction to ensure a reliable and stable environment. It would be advantageous to use input from multiple sources of expertise, but this is rarely ever practical.

As it concerns a cluster configuration, the analysis of the configuration is not limited to the individual systems. In cluster configurations, differences between system or node configurations (e.g., installed software, memory size, kernel configuration, etc) are important. Therefore, the nodes in a cluster must be compared against each other. With no tools in place to do this, it will be a manual effort to extract certain configuration information and possibly to write scripts to do a comparison and provide the results in a presentable way. This is a laborious and time consuming process, but a necessary task.

Reporting. If the analysis is accomplished and a list is generated identifying issues (problems) with the cluster configuration, there are still other obstacles. The issues identified are not organized in any logical way or according to customer requirements. Information should be sufficient to provide an adequate description that is to the point, professional and accurate, and that caters to different audiences (technical & non-technical).

More information may be included as desired. Descriptions in the reports, however, may reflect an individual's personal vision as opposed to a company's uniform recommended practice. This will result in inconsistencies among deliverables, sending mixed messages to customers. Further, it is also important to assign the correct description to each piece of information. This would appear obvious but becomes less so when handling similar pieces of information for different systems.

Now, the report presented should be consistently formatted. Technical personnel should not have to spend their time writing reports, when their technical skills may be used in better ways. This would therefore require additional resources for personnel skilled in technical writing Further, the reports must cater to the audience requesting the audit. The audience may include technical and non-technical management, sales people, and many others. A system is desired that is capable of crafting different reports, with the results of the analysis in accordance with an auditor's request.

Action Plan. Typically, the company performing the audit must prepare an action plan to resolve the issues that were determined. If the company does not act aggressively, the company may lose the business. However, in many situations, the company may have little assistance available from the audited company for the creation of an action plan. The preparation of the action plan is facilitated when a scenario is available with the steps to resolve a specific issue, together with the means to find additional reference material.

In summary, in today's world, companies are relying more and more on their IT systems for core parts of their business. This produces ever increasing requirements for reliability, availability, scalability, and performance. Therefore, companies are increasingly becoming more demanding because the consequences are severe when their IT systems suffer downtime. Also, the speed at which things are done is increasing, and accordingly the turnaround time for consulting deliveries is decreasing.

SUMMARY OF THE INVENTION

According to one aspect of the invention, there is provided an assessments framework, which includes a framework batch processor that is configured to perform either a static assessment or a dynamic assessment based on an assessments policy and an assessments task definition. The assessments framework also includes a partner batch processor that is configured to create a dynamic task definition and a dynamic assessments policy for an assessment created by a partner. The framework batch processor either retrieves the policy and the task definition from a database when executing an assessment not created by the partner, or receives the policy and the task definition output from the partner batch processor when executing the assessment created by the partner.

BRIEF DESCRIPTION OF THE SEVERAL VIEWS OF THE DRAWINGS

FIG. 1 presents an overview block diagram of an embodiment of an enterprise analyzer system that periodically collects information from the nodes in an enterprise, analyzes that information, and uses the issues which result from the analysis as a basis for generating a variety of reports.

FIG. 2 is a hardware block diagram illustrating the nodes in the enterprise linked to an analyzer server and a report generator server.

FIG. 3 is a hardware block diagram illustrating an embodiment of the computers and other nodes in an enterprise having an HAO support node.

FIG. 4 illustrates the organization of a collector database in one embodiment.

FIG. 5 illustrates a process of creating a collector in one embodiment.

FIG. 6 illustrates a process of installing a collector on an enterprise in one embodiment.

FIG. 7 is a flow diagram of the process of periodically executing collectors within an enterprise in one embodiment.

FIG. 8 is a software block diagram of the elements of the analysis server together with certain elements of the report generator server and an HAO Server in an embodiment of the invention.

FIG. 9 illustrates the organization of the tracker database.

FIG. 10 illustrates the process of an auditor designing an assessment task to analyze an enterprise and to generate reports in an embodiment of the invention.

FIG. 11, a continuation of FIG. 10, illustrates the process an auditor goes through to define the reports that are to be generated.

FIG. 12 is a flow diagram illustrating the process of creating a new analyzer in one embodiment of the invention.

FIG. 13 is a continuation of FIG. 12 illustrating the process of creating a new analyzer in one embodiment of the invention.

FIG. 14 is a table listing the user interface tools which are desirable to aid in analyzer creation in one embodiment of the invention.

FIG. 15 is a flow diagram of the general process executed by an embodiment of the analyzer harness when it performs the analysis of the nodes in an enterprise.

FIG. 16 illustrates the process of creating a report template in an embodiment of the invention.

FIG. 17 is a continuation of FIG. 16 illustrating the process of creating a report template.

FIG. 18 is a continuation of FIGS. 16 and 17 illustrating the process of creating a report template.

FIG. 19 is a flow diagram illustrating how reports are generated in an embodiment of the invention.

FIG. 20 is a continuation of FIG. 19 illustrating how reports are generated in one embodiment.

FIG. 31 illustrates a policy definition in XML format.

FIG. 32 illustrates an assessment type definition in XML format.

FIG. 33 illustrates another policy definition in XML format.

DETAILED DESCRIPTION

Figure 21:
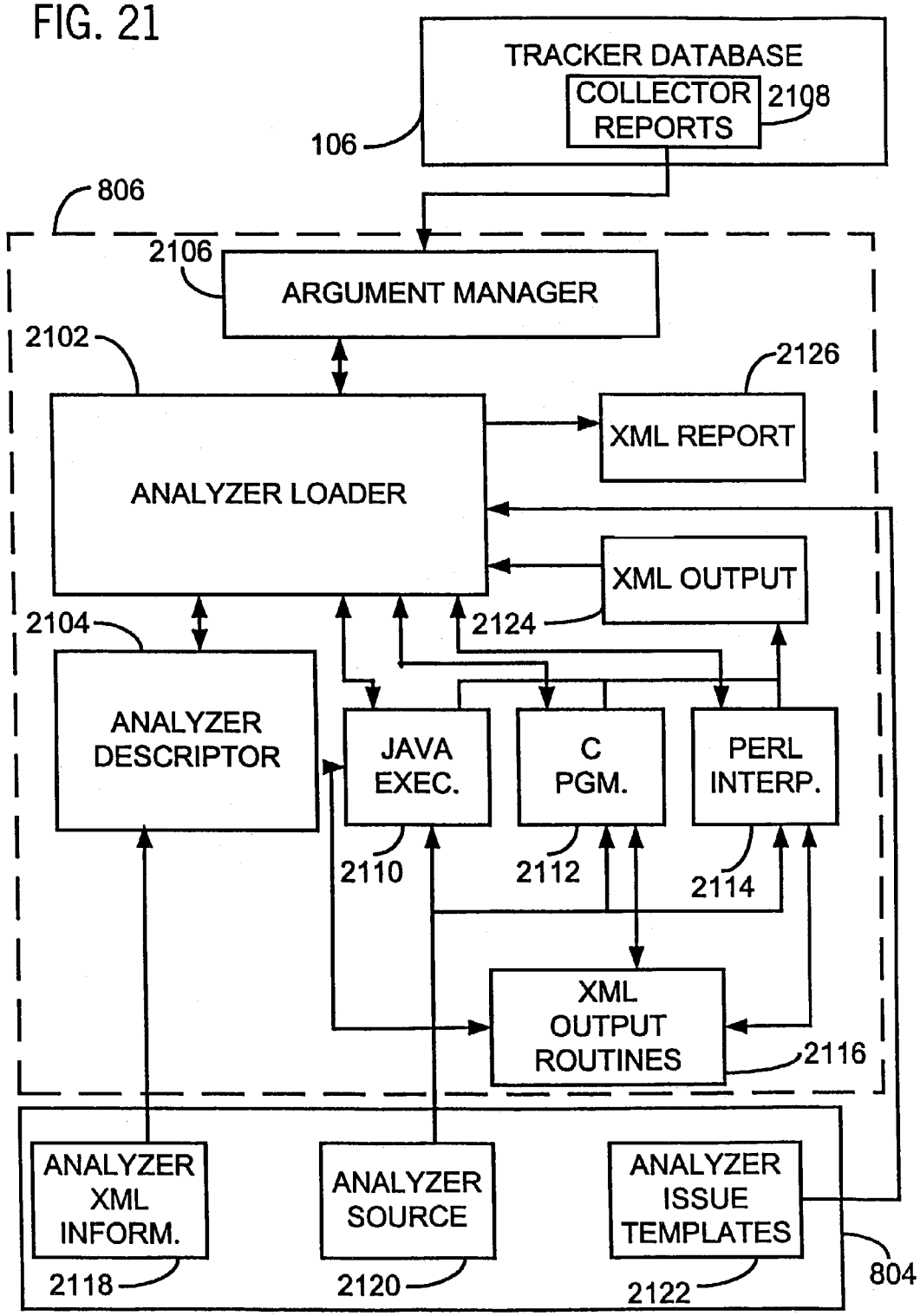
FIG. 21 is an overview block diagram presenting one embodiment of the elements involved in the execution of analyzers including the analyzer loader, the analyzer descriptor, and the analyzer argument manager.

The invention, as summarized above and as claimed in the appended claims, corresponds most closely to a second embodiment of the invention which is described below in the section of this detailed description that follows the subtitle: "STATIC AND DYNAMIC ASSESSMENT" and that forms a later portion of this detailed description. All of the earlier portions of this "DETAILED DESCRIPTION" present a detailed description of a first embodiment of the invention of which this second embodiment is a variation.

Definition of Terms

The following terms used in this application shall have the respective meanings ascribed to them below unless otherwise expressly defined in this application.

Analyzers. Analyzers are processes, defined by rules or programs, that analyze selected configuration information gathered by one or more collectors to one or more nodes, and that identify and report issues which may require attention.

Analyzer Harness. An analyzer harness is a framework or system which encapsulates, or wraps, and then executes an analyzer, providing the analyzer with collector data relating to a specific node or nodes of a specific enterprise each time an analyzer is encapsulated or wrapped and then executed.

Audit. This term is normally used for a formal examination or verification of financial accounts, in this context it means a very thorough examination or verification. One can expect a high depth of coverage and typically (but not necessarily) a significant breadth of coverage (i.e., multiple domains). Given the details, an audit typically takes a significant amount of time. Resources that perform Audits typically are subject matter experts with a lot of experience. Depending on the areas of coverage this is done by one person or by a team. Typically, this will require a team of multiple specialists.

Collectors. A collector is a command, or a series of commands, that causes programs installed at one or more nodes to gather configuration information about the node and that return reports defining the node's configuration.

Configuration. Any information specific to the static or the dynamic configuration of one or more nodes (or field computers, hardware, software, firmware, databases, storage systems, etc) at a given point in time.

Configuration Tracker. A tool which gathers configuration information from one or more nodes and which highlights changes between snapshots of the information gathered at different times.

Daemon. A Unix term that refers to a specific type of program or agent designed to work in the background.

Enterprise. Collection of computers, software, and networking that comprises the computing environment of a business.

Enterprise Name. A name that identifies a particular enterprise and that may be used as a retrieval key to access the configuration information of the enterprise.

Field Computers or Field Nodes. Field computers or nodes are computers or nodes installed at enterprise sites and whose operations are monitored from a central site.

Framework. This is a symbolic structure in which expert knowledge and experience is placed such that it may be automatically used to analyze enterprise configuration information gathered by collectors to identify issues that may require management attention. More specifically, in the context of the embodiments described below, expert system rules called analyzers are placed into a harness or framework and supplied with configuration information from enterprise nodes and are thereby enabled to report any issues that may have arisen within the enterprise.

High Availability Observatory ("HAO"). The High Availability Observatory is a software entity installed on a support node within an enterprise that periodically causes the execution of collectors on the enterprise nodes, captures the reports which the collectors generate, and transfers those reports back to a centralized tracker database for later use and analysis. It is noted that the HAO is merely one of many possible ways in which configuration information may be collected and analyzed in accordance with the teachings of the present invention.

Issue. An issue is any matter that may need to be investigated by or reported to the management of an enterprise. An analyzer performs tests upon configuration data gathered from the nodes of an enterprise by collectors. Those tests determine if there are any issues that need to be drawn to management's attention.

Issues Database. An issues database is a database containing issue information generated by analyzers when they process configuration information generated by collectors operating on the nodes of an enterprise.

Managed Element. A managed element is one or more physical devices (CPU, node, computer, etc) or logical devices (program, volume, thread, process, etc) that are monitored and/or managed. Each analyzer operates upon a particular class of managed elements, which may be a single node. A set of analyzers can be assigned to analyze all the members of a managed element of an enterprise.

Node. A node is a particular device in an enterprise, such as a server, work station, printer, router, switch, or hub. A multi-processor may be configured either as a single node or as multiple nodes.

Tracker Database. A tracker database is a database containing configuration information gathered from one or more nodes of one or more enterprises.

Overview of the System

Referring to FIG. 1, an overview block diagram is shown of an automated method 100 for repeatedly analyzing the configuration of an enterprise. The method 100 may generally be broken into three stages: collection, analysis, and reporting, as is shown in FIG. 1 by the dashed lines.

In step 102 of the method, enterprise configuration information is collected from field nodes. The collection step utilizes a set of collectors 104 to gather the desired configuration information. The collectors 104 are each commands or programs stored on a support node in the enterprise. The collectors 104 are run at periodic intervals on each node of the enterprise. The collectors 104 gather desired configuration information and store it as files in the tracker database 106. Specifically, for each node, there is a configuration information file stored on the tracker database 106 associated with each and every collector that generates configuration information.

In step 108, configuration information is analyzed by an analyzer harness 806 (FIG. 2) to identify issues within the field nodes. As part of this process, the analyzers 110 are used to investigate particular issues associated with the field nodes. The analyzers 110 are developed or written by experts to identify an issue or issues. The experts possess knowledge and information which is captured in written form as analyzers addressed to specific issues. The analyzers are then stored in an analyzer database 804 (FIG. 2) for later use by the analyzer harness 806.

An important aspect of the present invention is that the reports generated by this arrangement focus on specific issues rather than upon the status of an enterprise. Accordingly, the support engineers do not have to wade through large amounts of configuration information to isolate problems. Providing support for the enterprise is thus transformed from configuration gathering and manual analysis to executing a specified set of analyzers and allowing the framework "expert" to diagnose the problem and identify the pertinent issues.

As will be discussed in greater detail below, the analyzer harness 806 executes the desired analyzer 110 with the configuration information stored in the tracker database 106 and generates a report 2126 (FIG. 21) in XML format. The report 2126 identifies issues relating to the field nodes. This issue identifying report 2126 is then stored as a file in an issue database 112. If an issue has not arisen with respect to any node, the issue will be absent from the report 2126.

At this stage, the report 2126 generated by step 108 may be used to generate a full report along with text descriptions of the issues, as desired by an auditor. The XML report 2126 from the analyzer harness 806 is sent to a report generator 206 (FIG. 2). The report generator 206 may use report templates and rules database 204 to generate reports 208 (FIG. 2) addressing specific issues for each field node. These reports 208 identify the analyzers 110 used, the node from which the collector information is gathered, optionally the actual output of the collector 104, and the issue identified.

The issues stored in the issues database 112 may be used in another way to review the overall performance of the enterprise. To this end, in step 114 the issues are analyzed using rules written by the experts, and a report is generated as desired by the auditor. Generally speaking, the reports are generated from templates stored in the report templates and rules database 204. The reports may be presented in step 118 to enterprise management, technical management, the field engineering team, and to a workflow system or healer system (self-healing technology). This self healing technology will help the computer industry achieve the goal of providing servers and other node that repair themselves automatically, thereby staying in service without the need of human intervention over many years. The present invention, by automatically identifying issues that can indicate the possible future failure of nodes in enterprises and by generating reports of the type that can control the operations of other nodes which can download software to reinitialize disk drives and to perform other maintenance services automatically, moves the computer industry a giant step closer to providing servers and other nodes that maintain and repair themselves automatically with only minimal human intervention.

Referring to FIG. 2, there is shown a hardware block diagram for implementing the method in FIG. 1. An enterprise 300 is located on a customer site, and it includes a support node 308 which may be operated by the manufacturer of the computers at the customer site. Note that the support node 308 includes the customary components of a computer system including a CPU, a display or other I/O device, a network or communications interface, RAM or ROM or other memory, as well as stable storage devices such as disk or CD-ROM drives. Other servers or nodes described may also include the same customary components.

Software known as High Availability Observatory ("HAO") available from Hewlett-Packard Company is stored on the support node 308, and it manages the collectors 104 that gather configuration information. In the enterprise 300, the support node 308 is connected to the nodes 302 and 304 by a network which enables the collectors 104 to gather configuration information. Note that the enterprise 300 has a firewall 324 to act as a barrier to prevent unwarranted access to the enterprise 300 and to act as a central point of presence for maintenance and e-mail connectivity. Note that use of a support node in this manner is one of many ways in which configuration information may be collected and subjected to analysis.

FIG. 2 also illustrates the components located at a central site. The central site includes an analyzer server 800 situated remote from the enterprise 300. The analyzer server 800 is linked to the enterprise 300 via an ISDN line or some other form of wide area network. An HAO server 105, a report generator server 202, and a legacy server 210 are also part of the central site. The HAO server 105 is linked to the support node 308 by the ISDN line. Files of configuration information generated by the collectors 104 are saved in a tracker database 106. These files are retrieved from the tracker database 106 by the analyzer server 800, as is described below.

The analyzer server 800 includes an analyzer database 804 which stores the analyzers 110 and an analyzer harness 806 for wrapping the analyzers 110 retrieved from the analyzer database 804 with the files of configuration information retrieved from the tracker database 106. The analyzer harness 806 generates an issue report file in XML format which is placed into the issues database 112. As discussed more fully below, this report may be used to generate a full issue report as described above with respect to FIG. 1.

The legacy server 210 includes a legacy database 212. The legacy database 212 stores configuration information files obtained during prior manual collections or other means. The legacy database 212 can be linked to the analyzer harness 806. In the event that the HAO collectors are unavailable or not present to automatically and continually generate configuration information files, configuration information files can be retrieved from the legacy database 212. This information, however, is only as current as the most recent manual collection. But other automated techniques may be used to place node configuration information into the legacy database 212.

Note that the HAO is only one way in which configuration information may be gathered from an enterprise. This can and should be done for every node in each enterprise so that the benefits of configuration information collection and analysis can be brought to bear universally.

The report generator server 202 is also a part of the central site. The report generator server 202 is linked to the analyzer server 800 through the (XML) issues database 112. The report generator server 202 includes a report generator 206 for receiving the XML issue reports from the database 112. As discussed above with respect to FIG. 1, the report generator 206 may generate a full report concerning the identified issues including more detailed information about each issue.

The issue reports are stored in an issue database 112 as described. A report templates and rules database 204 is part of the report generator server 202. The server 202 stores various report templates and rules which are developed by subject matter experts. These can be field personnel or product development personnel. The application of these rules helps to determine the overall performance of the enterprise 300. At an auditor's request, the report generator 206 will retrieve (1) the rules from the report templates and rules database 204 and (2) the issues stored in the issues database 112, and will then generate a report 208 using the templates from the report templates and rules database 204. The report may be in any desired format, such as Microsoft Word, Excel, PowerPoint, or HTML or in some special format designed for delivery to some other computer or node for use in automatic control. The report may identify all the issues with the enterprise 300 to enable the auditor determine the overall performance of the enterprise 300.

Referring to FIG. 3, the cluster configuration example described above, along with an analysis of the enterprise configuration, will now be discussed in more detail. As part of the enterprise 300, three nodes 302, 304, 306 and several personal computers 314–322 are linked through a network 312. The nodes 302, 304, 306 include utilities 303, 305, 307, respectively to set up and configure the nodes properly. The enterprise 300 also includes a file server 326 with a volume 328 for storing programs. The file server 326 is linked to the nodes 302, 304, 306 to enable these nodes to access the programs from the volume 328 on the file server 326. As discussed above, the HAO support node 308 is also part of the enterprise 300, and it includes a collector database 310. The HAO support node 308 is linked to the HAO server 105 on the central site via an ISDN line or other means of connection. A firewall 324 is installed on the enterprise 300 for the reason described above.

The three nodes 302, 304, 306 are arranged in a cluster configuration. In this configuration, the nodes are each configured as a back-up to each other to ensure that executable programs can be run on a back-up node if the node assigned to run a program fails. To configure the cluster configuration properly, the utilities of each node must be set up to ensure that the node recognizes or "sees" the program on the volume 328. In other words, the volume 328 of the file server 326 must be "attached" to each of the nodes 302, 304, 306 to enable each to run a program or access a program on the volume 328. If a PC 314, for example, is using a program through the network 312 that is normally run on the node 302, the volume 328 must be attached to the node 304 to run that program in the event the node 302 fails or is otherwise unable to execute that program. The cluster configuration is realized using a Hewlett-Packard Company program known as MC/ServiceGuard. The MC/ServiceGuard program creates a cluster configuration which ensures that this type of back-up occurs.

In this example, it is desired to analyze the configuration information of the cluster arrangement. To this end, the collectors 104 from the collector database 310 on the HAO support node 308 are sent to the nodes 302, 304, and 306 to gather configuration information. This information, in file form, is then returned and is sent to the central HAO server 105 (FIG. 2) to be stored as files on the tracker database 106. The tracker database 106 identifies the node from which the information was gathered, and the files contain facts concerning what was collected, such as storage or memory capacity, etc. At an auditor's request, the analyzer harness 806 (of analyzer server 800) retrieves the desired configuration information files and the desired analyzers 110 from the analyzer database 804 and wraps them together, forming a framework that can generate issue reports 2126 in XML format. Referring now to FIG. 21 and FIG. 3, each issue report 2126 indicates typically that a particular problem exists within a particular node. For example, the report 2126 may report that the node 304 does not recognize the volume 328 on the file server 326 because it has not attached this volume 328. If the node 304 cannot recognize or "see" the volume 328, node 304 cannot run a program in the event that the node 302 fails.

Another exemplary report 2126, discussed below, might indicate that the storage or memory capacity of the volume 328 attached to the node 304 is a less than 5% of its total capacity. This capacity level may not be sufficient to provide for expected growth in the number or size of the files stored on this volume.

Detailed Discussion of System Elements

With reference once again to FIG. 1, the collectors 104 are commands or sets of commands that can run on each of the nodes of an enterprise, testing the configurations of those nodes, both static and dynamic, and generating collector reports reporting their findings. At step 102, the reports generated by these collectors, in the form of files, are collected and are transmitted to a centralized tracker database 106 where they are stored. Many types of collectors can be used in this manner. A family of collectors 104 that are run at a particular enterprise site are defined by the service engineers at that site and may be the very same programs that the service engineers run when they visit the site and manually run tests to learn about the system configuration.

At the central site, the analyzers 110 read and analyze the collector information contained in the tracker database 106. Each analyzer is created by an expert in system testing and maintenance to evaluate the information generated by one or more collectors and to look for one or a few specific potential problems that may be present. These problems are called "issues". As a simple example used throughout the remainder of this specification and in the appendices, an issue that might be of concern to the management of an enterprise could be the fact that one or more volumes attached to one or more nodes are filled to within five percent of their maximum capacity and are in danger of possibly running out of room to store additional files. Different analyzers test for different conditions and focus upon different issues. At step 108, the analyzers are called upon to analyze the configuration information in the tracker database 106 and to thereby generate issue information which is stored in an issues database 112.

In addition to the collectors 104, which define what tests are run upon the individual nodes of an enterprise, and in addition to the analyzers 110, which search through the configuration information gathered by the collectors 104 looking for issues that may need to be brought to the attention of management, the present invention contemplates the use of additional rules and report templates 116.

These enable the performance, at step 114, of a further analysis of the issue information using rules written by experts; and the generation of a variety of useful reports directed to different audiences.

As indicated at step 118, one of these reports might be a summary report, written in laymen's language, directed to the non-technical management of an enterprise to advise them of critical problems and trends. This report may indicate general conditions that exist, and it may suggest reasons why this management should be concerned about these conditions through the use of simple examples and explanations. Other possible reports would be reports for technical management which might be fairly detailed, indicating in technical terms precisely what problems exist and what solutions might be considered. A separate set of reports might be generated for the field engineering team documenting the status of the enterprise, indicating points that need to be watched, and possibly suggesting field corrections.

An issue description database 117 may be provided which can supply the report generating software with highly detailed descriptions of every issue that may arise, including examples and also explanations of why these issues are of concern to management, written in non-technical language that can be understood by non-technical managers. The issue descriptions in the database 117 thus supplement the very brief issue descriptions which result from analysis and which appear in the issues database 112.

In addition to being based upon the occurrence of issue information in the database 112, reports may be generated directly from the underlying tracker database 106 such that the reports may indicate the status of the enterprise as well as the occurrence of issues of interest to management. In addition, status information from the tracker database 106 may be used to supplement and augment reports otherwise based upon the occurrence of issues.

If work orders for the field engineers are generated through computers or other nodes in a work flow system, a machine-readable output of the report generator might be sent directly to the work flow system to cause it to generate work orders that cause service personnel to be sent immediately to the site to carry out time critical maintenance. For example, reports of failed disk drives in disk arrays can be transformed automatically into work orders that schedule a repair team to visit the site and to replace the drives before a mission-critical enterprise is shut down by further failures. If automated tools or "healer system" exist for making corrections to the nodes in the field, then some reports may be generated which become instructions to the healer system that cause immediate correction, through automated means, of certain problems to ensure continued operation of servers that are mission critical to the enterprise. For example, corrupted files can be downloaded and reinstalled automatically, and non-bootable systems may be repaired.

Technical reports can provide action plans which explain precisely how a problem can be addressed or a machine repaired. Through computer linkage, an electronic report can trigger the automatic ordering of parts and the scheduling a technician to visit the site to install the parts. It is only a small step beyond this to provide for automatic repair and correction of defects such that the nodes become substantially self healing.

FIG. 2 presents an overview hardware diagram of both an enterprise 300 located at one or more business sites and of an analyzer server 800 and report generator server 202 which might typically be located at a central site but which could be also located at an enterprise site.

In FIG. 3, the nodes 302 and 304 and possibly many other nodes exist at the enterprise site 300. These nodes would typically be servers, but they could be routers, printers, and other computational devices that are to be monitored. Also at the enterprise site 300, a support node 308 is networked together to the other nodes 302 and 304. The support node 308 includes tools (the HAO system) that enable the collectors 104 to run periodically upon the nodes 302 and 304 and other enterprise nodes, thereby generating information defining the static and dynamic configuration of the nodes 302 and 304 and other nodes. The support node program 402 (FIG. 4) captures the reports generated by the collectors 104 and transfers them through the firewall 324 and over some form of wide area network to the tracker database 106 within an HAO server 105 that is typically located at a central site. Accordingly, the tracker database 106 contains an up-to-date series of collector reports defining the configuration of the nodes 302 and 304 within the enterprise. This configuration information is available for service personnel to peruse and to study when trying to decide what types of services are needed to support enterprise 300 operations.

Some enterprises 300 may not be equipped with support nodes having the HAO program 402 and collectors 104 or their equivalent. Some or all of the configuration information for such enterprises 300 may be maintained upon a legacy database 212 (FIG. 2) within a legacy server 210. This information may also be used to support an analysis of an enterprise.

At the central site, an analyzer server 800 contains an analyzer database 804 which contains analyzers 110. These are rules or programs that implement tests defined by technical experts. The analyzer server 800 also contains an analyzer harness 806 which is able to harness individual analyzers 110 or rules together with configuration information gathered from specific nodes 302 and 304. This information is retrieved from the tracker database 106 or the legacy database 212. The analyzers 110 analyze this information and thereby determine whether there are any issues that need to be addressed. The analyzer harness 806 may receive an issue report each time an analyzer 110 is run if there are any conditions that need attention. The analyzer harness 806 adds to those issue reports information identifying the particular nodes 302 and 304 and the issue or error messages associated with the analyzer 110 and passes the issue reports out as XML reports 2126. These reports are is both human and machine readable. They list all of the issues which may need management attention. These are stored in an (XML) issues database 112.

The XML issue report is passed on to a report generator 206 within a report generator server 202. The report generator 202 includes a report templates and rules database 204 that controls the generation of a wide variety of different reports for different audiences, as was explained above. For example, some reports may simply restate each of the issues in a nicer format and sorted in a particular order for presentation to a technical team that needs to gain a detailed understanding of all the issues which have arisen. Other templates may be assembled under the control of elaborate rules which first scan and analyze the information contained within the XML issue report, possibly comparing it to previous similar reports generated on earlier occasions, to spot trends and various conditions that are in need of attention, thereby functioning as a configuration tracker. These reports may generate high level explanations of the state of the enterprise computers and that may be read and understood by lay people, including the management of the enterprise. Trends in the information not apparent in the detailed issue report may also be spotted and brought to light in this manner. Accordingly, a wide variety of technical and non-technical reports 208 in a wide variety of differing formats and levels of detail may be generated and passed on to management and to technical personnel, as well as to automated systems that may automate the scheduling of servicing or even cause the actual repair of the nodes in the field.

Collectors—Gathering Configuration Information

The next part of this detailed description focuses upon FIGS. 3 to 7 which explain how the collectors are created and then used to gather configuration information and to feed that information into the tracker database 106.

FIG. 3 presents a more detailed description of an enterprise 300. The enterprise 300 includes three servers 302, 304, and 306 which are identified as "nodes" in FIG. 3. Illustrative of the many possible servers, routers, printers, switches, and other audible devices that may be included within an enterprise, the nodes are tied together by a network 312 which also connects to a large number of work stations or PCS 314, 316, 318, 320, and 322. These work stations or PCS also qualify as nodes and may also be monitored by the present invention.

A number of utilities 303, 305, and 307 are installed upon each of the nodes 302, 304, and 306. While many utilities may be present on a particular machine, of particular concern to this description are utilities that might be useful to service personnel when investigating the configuration of the machine. These are utilities that can be run by service personnel and that would then generate reports which the service personnel might view on the monitor or print out and then use in the course of diagnosing various system problems.

While many such utilities would be useful, for the purpose of simplifying the present description of the invention, only one utility will be discussed in detail and used as an example throughout the description of the invention which follows. Clearly, many dozens of other utilities could be used in the same manner to generate all kinds of reports and to support all kinds of analysis of these nodes and the generation of all kinds of reports.

The selected utility is one called "bdf". With reference to the Appendices of the parent application, and in particular to Appendix E, the command bdf-il typed on a line by itself as a command issued to any computer or node gives a report on what volumes 328 from various file servers 326 are "mounted" upon a particular node 302, 304, or 306 whose configuration is being determined. A report is generated such as that shown in Appendix E of the parent application. This report indicates the volume that is mounted, its size, how much of its capacity is utilized by files, how much is available for further storage, and the percent of the storage area that is utilized.

With references to lines 14 and 16 of Appendix E (of the parent application), it will be seen that two of the volumes have 96 percent of their available storage space filled with files. Given the importance of maintaining additional available storage space in file systems for the addition of additional files, service personnel examining this machine would probably conclude that the volumes were overly full and that adjustments must be made to ensure that additional files added to these volumes do not cause the volumes to overflow and to produce errors and to not accept any more files.

Within the support node 308, there exists a collector database 310, the contents of which are illustrated in FIG. 4. This database 310 includes HAO collector program 402 which is capable of launching a collector command, such as the "bdf" command illustrated in the preceding paragraph, upon any of the nodes 302, 304, or 306 and also upon the PCs 314, 316, etc. This collector program periodically causes collectors to run upon each of the nodes that are being supervised by this particular support node 308. This is done in accordance with a collection schedule 404. The nodes examined are included in a node list 406. The collector portion of the collector database 310 is shown at 408. It contains a list of all the collectors that are to be executed, together with a logical name and an ID number for each collector, as is shown for the "disk usage" collector "bdf-il" assigned the ID number "100024".

In some cases, a collector may not be a simple command, such as illustrated above, but it may a series of commands to run certain programs or utilities in a certain order. Such a list of commands can be stored in a file which can be called a complex collector. Complex collector files are stored at 410 and are also stored within the utilities areas 303, 305, and 307 on the nodes 302, 304, and 306. In the case of a complex collector, the list of collectors 408 includes the name of the file that contains the list of commands which comprise the complex collector, rather than the actual collector commands themselves.

FIG. 5 illustrates the process of creating a new collector. At step 502, a new collector is created by simply adding it to the list of collectors 408. The collector command 506 is typed in along with a name for the collector 504 and its I.D. number 508. As soon as a new collector is added to the list of collectors 408, it becomes active. Of course, there may be several lists for different collectors that are run more frequently or less frequently on any given enterprise system.

Once a collector is created, it may be installed upon an enterprise 300, at step 602, by installing it upon the support node 308 of the enterprise within the collector database 310, and in particular in the portion 408 of the database 310 reserved for collectors. Complex collectors, consisting of multiple commands, must be stored as script files on the nodes 302, 304, and 306 with the names of the script files added to the list of collectors 408. Finally, at step 604, the collector is scheduled for execution periodically in the schedule 404.

FIG. 7 illustrates the execution of collectors against the nodes 302, etc. in an enterprise 300. Execution is typically triggered by a timer 702. (Execution may also be triggered by things like a configuration item which the system has determined has changed its state such that the change in state of the configuration item causes a related analysis to be carried out.) When a timer expires, the node list 406 within the collector database 310 is referenced, and the nodes are processed one at a time. At step 704, a node is selected. At step 706, the list of collectors 408 is referred to, and a first collector is selected for execution. A command is sent to the node 302 being audited to execute the designated collector. This can be done, for example, using a utility such as Telnet over an Internet network, but great care must be taken that the collectors are safe to execute and do not interfere with normal operations of mission critical nodes. In the HAO embodiment of the invention, a collection agent and a collection daemon (not shown) are installed on each node (see U.S. Pat. No. 6,148,402 which issued on Nov. 14, 2000 to Randall B. Campbell). The support node collector program 402 sends a collector 104 to the collection daemon on the node 302 to be audited. The daemon passes the collector 104 on to a collection agent. The collection agent executes the collector 104, captures its standard output and standard error outputs (STDOUT and STDERR), and returns the collected output information to the daemon, which returns it to the collection program 402 running upon the support node 308.

At step 710, if there are more collectors, then program control branches back to step 706 where additional collectors are caused to be executed upon that same node 302. Then, at step 712, if there are more nodes 304, etc. to be audited, then program control returns to step 704 where the next node 304 is selected, and the analysis proceeds as described above.

Finally, after all the collectors 104 have been run at all the nodes 304, etc. to be audited, and all of the information from the collectors 104 has been gathered, the collector output is transferred to the central tracker database 106 at a central site for further analysis.

Analyzing the Configuration Information

The analysis process is set forth in block diagram form in FIG. 8, this Figure shows the various databases and programs that are involved in the analysis and report generation processes.

With reference to FIG. 8, the analyzer server 800 is shown at the top of the figure and contains the analyzer database 804 and the analyzer harness 806. In the lower right portion of FIG. 8, the HAO server 105 is shown which contains the tracker database 106 that contains all of the configuration information with respect to the nodes 302 and 304, etc. in the enterprise 300. To the left in FIG. 8, the report generator server 202 is shown together with the database 204 that contains the report templates and rules and the report generator 206.

The first step in the analysis process is that of creating the analyzers 110 and creating the report generation rules and templates 116 that will generate the reports 208. As shown in FIG. 8, content experts 812 use analyzer creation utilities 802 to create the various documents that define the analyzers 110 and store them in the analyzer database 804. These and other content experts 812 also generate the rules that govern report generation as well as the templates for the reports, and they store them in the database 204 within the report generator server 202. Each analyzer 110 focuses upon a particular issue or set of related issues that can arise within the nodes 302, etc. in the enterprise 300. Each analyzer is designed to generate an XML report whenever an issue is found to be present and in need of consideration by management. When all of the issue information for a particular set of nodes are present within the (XML) issues database 112, then all of this information may be analyzed by a higher-level set of templates and rules 118 that are stored in the database 204 and that control the generation of high level reports 208 summarizing the condition of the enterprise 300 in ways that the management of the enterprise can understand.

Once the analyzers 110 are created and installed and the report templates and rules 116 are put in place, the system may then be called upon to do an assessment of the enterprise 300. An auditor 814, who may be an engineer or some other person desirous of learning about the condition of the nodes 302, etc. in the enterprise 300, requests an audit by using a task definition system 810 to create an assessment task. At 814, an assessment task A is shown. The assessment task 814 includes, in its definition, a list of the enterprises that are to be analyzed, a list of the nodes at each enterprise which are to be subjected to analysis, and a list of the analysis that is to be performed in the form of the actual names of the analyzers which are to be executed. In addition, the assessment task 814 includes a list of the reports that are to be generated following the analysis. Report generation may be done at the time of the analysis, or the reports may be generated at a later time in a separate session.

Once a task 814 is defined and initiated, the list of enterprises, nodes, and analyzers are passed to the analyzer harness 806. The analyzer harness 806 then proceeds by picking up the analyzers 110 from the database 804, one at a time, and with each analyzer 110 the analyzer harness 806 proceeds through the nodes 302, etc. one at a time. For each node, the harness 806 creates a framework linking the analyzer 110 to configuration information files that are retrieved from the tracker database 106. Using this framework, the harness 806 wraps the analyzer 110 in this environment and causes it to be executed in the context of the list of configuration information files that contain configuration information gathered from the node 302 that is being currently analyzed. During its execution, the analyzer 110 calls upon special subroutines that generate short XML reports of any issue which warrants management attention and also of any error condition which may arise. After the analyzer 110 terminates, the analyzer harness 806 takes these small issue XML reports and expands them, using issue text templates retrieved from the analyzer database 804 and also information as to the identity of the node and the identity of the assessment task, and creates an expanded XML report which is stored in the (XML) issues database 112 after the analysis have been run against all of the nodes 302, etc. In this manner, an extended issue report is generated in an XML format that is both human readable and also that lends itself to being incorporated into a database for automated retrieval and manipulation.

The list of reports from the task definition 814 is passed to the report generator 206. The report generator 206 also has access to the report templates and rules database 204 and to the XML issue report which can be retrieved from the (XML) issues database 112. Using all of these materials, an expert system engine within, or supplementing, the report generator 206 evaluates the rules and, under their guidance, examines the issue information, generating high-level conclusions for management concerning the general state of the enterprise. Then, using the report templates, the report generator 206 prepares a variety of reports, as has been explained, setting forth the status of the enterprise 300 and its nodes 302, etc. These are then fed to various recipients of the reports 817.

FIG. 9 illustrates the contents of the tracker database 106. In this embodiment, a tracker database 106 is established for the United States, another for Europe, and another for Asia. These tracker databases 106 are connected by conventional networking to the various enterprises 300 to which they relate so that they can collect information 24 hours a day and thus remain current. As illustrated in the figure, the tracker database 106 information is organized first by enterprise, within the enterprise by node, within the node by the collector, and within collector by the output files each collector has generated, each time and date stamped such that there may be a historical collection of configuration information. With this organization, the analyzer harness 806 is able to request the information file generated by any collector 104 when running on any node 302, etc. within any enterprise 300.

FIG. 10 presents a flow chart of the process by which an auditor 814 defines the assessment task that is to be carried out by the analysis server 800 during any given processing operation.

The auditor 814 begins by specifying the type of assessment that is to be carried out. At 1002, a first type of assessment is the "full audit request." The full audit request looks at all aspects of the enterprise 300, right down to the smallest details. It also generates high level reports for management and for others, drawing general conclusions about the state of the enterprise, the nature of the problems found, and the possible solutions that may be considered. It is the full audit request or full audit of portions of an enterprise that takes full advantage of the present invention's ability not only to collect lots of configuration information using collectors 104 about an enterprise 300 and to analyze that information using multiple analyzers 110, but also to have rules associated with a report generator 206 that can look over the issues developed by the analyzer 110, scan the issue information looking for statistical indications and trends, and also compare present and past issue information to see trends over time, generating meaningful reports about where the enterprise 300 is headed and what can be done to prevent its failure and to improve its flow operations and reliability. Once this information is known, communicated, and polished, it is possible to move into the realm of self-healing systems. In this realm, an issue is detected automatically, the recommended action is known, and the issue is fixed before it becomes a problem. The customer is notified of the fix rather than the issue.

A second type of assessment is called simply an "assessment." An assessment involves the use of large numbers of collectors 104 whose output is processed by a fairly large number of analyzers 110. A detailed report of all the issues identified is then generated.

A third type of assessment is the health check, which states in fairly summary terms whether the nodes within an enterprise are OK or whether there are problems that need to be addressed. This a fairly simple "go" or "no go" type of evaluation that looks primarily at critical values only and that generates a minimal report.

Figure 25:
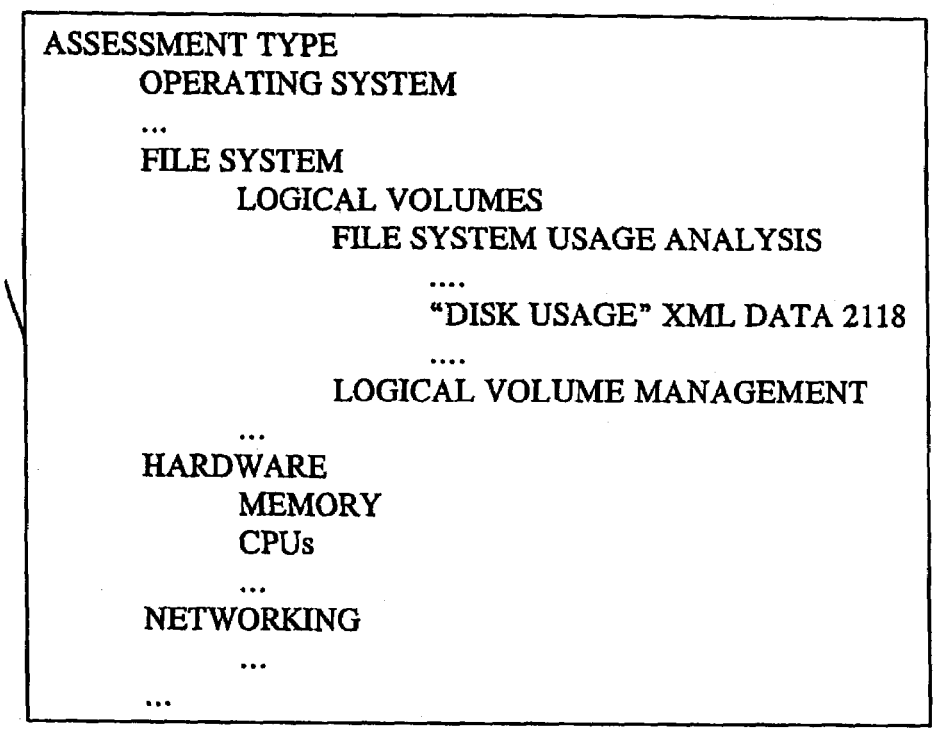
FIG. 25 illustrates an XML hierarchy which can be used to generate varying scope assessments of an enterprise.

The auditor 814 may select any one of several different types of coverage for each of these assessments. An overall assessment runs all the analyzers 110 and generates a large amount of issue information about all aspects of an enterprise 300. A hardware and operating system assessment runs only those analyzers 110 that focus upon the hardware and operating system elements, as opposed to their programs, file systems, networks, etc. A networking assessment focuses upon the networking aspects of an enterprise 300, including such things as network load, network slow-down, and the conditions of the various network routers and switches. A file management and storage assessment focuses upon the condition of the disk drives, the availability of space within the file system, and other such issues. The assessment hierarchy available for task definition can match the assessment XML hierarchy of XML control information for the individual analyzers, as is illustrated in FIG. 25 and as is explained at a later point.

The next step in the task definition process is step 1004, selecting a tentative list of analyzers consistent with the assessment type selected. The tentative list of analyzers 110 is selected automatically by the task definition system 810 and is displayed with check boxes beside each analyzer name; and then the auditor is permitted to view and to modify the list of the analyzers that will actually be processed by possibly adding some, and by possibly eliminating some that are not required or essential to a given audit. Only the analyzers with their check boxes checked are actually executed.

Next, the location of the assessment is designated. At step 1006, a region (United States, Europe, etc.) is selected, or possibly a legacy database 212 source of information is selected if real-time monitoring of the enterprise 300 to be audited is not presently implemented. At step 1008, one or more enterprises 300 within the selected region are selected for auditing. At step 1010, a listing of the enterprise 300 nodes 302, etc. is automatically generated and displayed, again with check boxes, such that the auditor may go in and remove some nodes from the audit, and add other nodes to the audit. Next, at step 1012 in FIG. 11, the auditors enter information identifying themselves and also comments, such as a general statement of why the audit is being conducted. For example, if the customer has been experiencing certain difficulties, the auditor may wish to summarize this at this point so that the reason for the audit appears in the final report.

At step 1014, the nature of the report or reports desired is selected. The auditor may only report a management summary report, or he or she may request a technical summary report. On the other hand, the auditor may wish to see all of the technical details. A special marketing report, indicating areas where the enterprise may be persuaded to purchase additional software or hardware, can also be generated. A detailed manufacturer's report would report on the update level and versions of all the software and hardware and might contain information concerning failures that might be useful for future maintenance of the enterprise, or that might suggest the need for improvements in system component design.

A format for the report is also selected. The text report can be generated in the form of a word processing document suitable for printing in color. High-level reports might be generated in presentation format for projection and display to management. An HTML report might link to underlying explanatory details from a general report. Additionally, the auditor 814 may wish to request that statistical information be presented in tabular, graphic, or chart form to make it easier to understand.

The report format will also vary depending upon the target of the report. Thus, the above report formats have assumed that humans are to receive the report. However, if the report is destined for a database, it would, of courses, be generated as an XML document suitable for simple database entry or possibly be fed directly into an SQL or other type of database. If a work flow system exists that can generate work orders for service personnel, it may be desirable to generate a machine-readable file containing information from the report that can be directly transferred into the work flow system to directly result in the scheduling of maintenance or repair. This can be done in particular for critical issues that need immediate attention. Alternatively, if a healer system facility is available that can go out and reconfigure or load new software onto nodes, a machine-readable version of a report may be generated in a format that is acceptable as input to the healer system so that such repairs can be commenced immediately. This is desirable to achieve fail-safe operation of the nodes 302, etc. not just in mission-critical applications, but in most or all applications. The present invention thus can be used as a crucial feedback link in the realization of truly self-healing systems.

Finally, at step 1016, a delivery mechanism is selected. The reports may be printed, of course, or they may be e-mailed to a recipient list that needs to be supplied. In the case of machine readable reports destined for work flow system or healer system or databases, the Internet address of the recipient computers must be provided.

Creating New Analyzers

The analyzer creation process is shown in flowchart form in FIGS. 12 and 13, and FIG. 14 presents a list of user interface facilities which can aid in the process of creating new analyzers. In addition, Appendices A, B, C and D present simple examples of the various components of an analyzer.

As a simple example of how an analyzer can be created, the "disk usage" collector number 100024, whose creation was illustrated at 500 in FIG. 5 and whose storage in the collector database 310 is illustrated at 408 in FIG. 4, can be used as a source of input information for an analyzer 110 created to illustrate the process.

Recall that the "disk usage" collector 104, when executed upon a node 302, generates the simple textual report that is illustrated in Appendix E (of the parent application). Simply stated, this report lists, for every file system volume attached to a given node, the name of the volume and, among other things, the percentage of the volume's file storage area that is filled with files. Appendices A–D (of the parent application) illustrate the details of an analyzer that is assigned to look at the report shown in Appendix E (of the parent application), to extract records concerning all volumes whose occupancy level exceeds the 90 or 95 percent or that are full, and which are therefore in danger of overflow. This analyzer 110 will test the numeric information on each line of the report shown in Appendix E (of the parent application), locate the percentage figure, compare it to 90 and 95 and 100 percent, and then generate a issue report if and only if the amount of storage occupied exceeds the 90 or 95 or 100 percent limit. As will be explained, this issue report is generated by the analyzer within a framework environment where the analyzer does not really "know" which node 302, etc. it is evaluating. Accordingly, the report is then embedded into a larger XML report generated by the analyzer harness 806 that identifies the node and that also includes textual messages explaining the nature of the issue which has arisen.

Referring to FIG. 12, the analyzer creation process preferably begins with the content expert 812 using a word processor to prepare a textual description of the analyzer 110, explaining what it is to do in human-readable terms. This textual report appears in Appendix A (of the parent application) for the exemplary analyzer that is designed to accept and to analyze the report shown in Appendix E (of the parent application) provided by the collector "bdf-il" which evaluates the usage of volume storage space.

The expert content that is put into the analyzers covers formal and systematic knowledge that can be easily communicated and codified and is readily available (explicit knowledge) and personal information that is based on experience and learning and is often unrecorded and unarticulated (tacit knowledge) and is more difficult to formalize.

Next, step 1204, the analyzer creation utilities 802 gather information identifying the content expert 812 of this analyzer 110 as well as creation revision dates and other background information.

At step 1206, the designer 812 is presented with a list of all the collectors, organized by managed element class, and is invited to select which collectors will provide input information to this analyzer. In general, a single analyzer may accept input information from one or any number of collectors 104 and may then process that information in any number of complex ways. Dozens of collector-generated node configuration files may be fed into an analyzer that may be a huge computer program written in "C" or "C++" and compiled from numerous "C" or "C++" program files under the control of a "make" file. On the other hand, an analyzer may be a very simple program written in "java" or "perl." To keep the example being developed here simple, the analyzer will collect information only from the collector identified as "disk usage" and assigned the identification number "100024".

Next, at step 1208, the designer creates one or more analyzer issue templates, which may contain placeholders for the insertion of variable information. Such a template is illustrated in Appendix D (of the parent application), where three templates are preceded by template numbers. These templates contain, within their text, delimiters marking where variable information may be inserted. In this case, the variable information identifies the file system directory that has given rise to an issue.

Next, at step 1210, the source code (with comments) for the analyzer is created. A typical source code file is illustrated in Appendix B (of the parent aplication). This source code file is either compiled or interpreted or otherwise executed after having been harnessed and wrapped in a framework that provides it with the proper input information to do its analysis of a particular node. The source code file does not know the identity of the node whose configuration information it is analyzing. It simply knows that a list of file name arguments has been passed in and, from their order, it knows from which collectors those files originated. In this simple example, the argument is a single file name, the name of a file that contains the report which appears in Appendix E (of the parent application) and which contains information defining the identity of the attached file systems and how close their volumes are to overflowing, as has been explained. In a more complex case, a series of source files developed by a series of different collectors would be passed as arguments into the analyzer code for execution. The analyzer code is written independently of any particular node, in most cases, so that the same analyzer may be used repeatedly to analyze hundreds of different nodes having thousands of different configurations.

In the embodiments of the invention presented here, the analyzer harness 806 is written in "java," and accordingly, "java" may be used as one of the languages in which an analyzer may be written. Byte code compiled versions of such "java" analyzers are simply loaded and executed directly by the analyzer harness 806 and are passed the list of file names as an input.

In some cases, it may be desirable to write an analyzer in the "C" or "C++" programming languages, or it may be desirable to adapt an existing program written in "C" or "C++" that is already being used for field testing to serve as an analyzer. Such executable files are compiled and linked under make file control in the normal manner and are placed into operation by the analyzer harness 806 which calls a conventional operating system "shell" utility to launch such executable analyzers. Such "C" or "C++" programs may be highly complex and may include a source module as well as additional code modules and a make utility for controlling compiling and linking. Provisions in the analyzer creation utilities 802 are made to include all of these analyzer file components in the analyzer database 804 and to recompile them as needed for execution whenever changes are made to the source code, just as in a standard program development environment.

In other cases, the analyzer may be written in an interpretable language such as perl or "kshell" rather than in "java" or "C" or "C++". In these cases, the analyzer harness 806 launches an interpreter program and passes to it the argument list containing the names of the files containing the collector configuration information that is to be processed.

As step 1210 indicates, the present invention accepts analyzers written in "java," "C" or "C++," "perl," or "kshell" and stores them in the analyzer database 804 complied (if necessary) and ready to be executed.

With reference to FIG. 13, step 1212 calls upon the designer 812 of an analyzer 110 to specify which nodes 302 it is to analyze, if necessary. The default is that an analyzer 110 processes all nodes 302, and then the analyzer 110 is called upon by the analyzer harness 806 to process files generated by the collectors 104 for all of the nodes 302, 304, 306, (etc.) in sequence, with the analyzer 110 being executed one time for each node with different input file argument lists provided each time the analyzer 110 runs.

In some cases, a given analyzer may operate on a subset of managed elements, which may be specified as a collection of nodes included in a list of managed elements. Alternatively, in a system where nodes are clustered together to back each other up and to provide alternate platforms for executing programs when one or another of the nodes in a cluster is out of service, it may be that a given analyzer processes input data received from all nodes in a cluster simultaneously.

The content expert 812 having completed the process of defining the analyzer 110, it now remains to store the information defining an analyzer 110 in the analyzer database 804. The template text (Appendix D of the parent application) and the source code (Appendix B of the parent application) along with the textual description (Appendix A of the parent application of the parent application) of the analyzer are simply stored as separate files in the analyzer database 804 and are linked to the name of the analyzer in a directory. There remains the other information provided by the user defining the conditions under which the analyzer is to run, the names of the files containing the templates and source code, the author of the code, the particular language in which the template is written, and other things. This information, in the form of an XML analyzer descriptor file, is also saved in the analyzer database at step 1214. An exemplary XML file appears in Appendix C (of the parent application).

With reference to Appendix C (of the parent application), this XML file portion of the analyzer definition includes the following:

A standard XML header;
The analyzer name and version number;
The author's e-mail address;
A one line description of the analyzer;
A link or pointer to the ASCII template that defines the issues (see Appendix D of the parent application);
A link or pointer to the analyzer code file;
The particular programming language ("kshell", "java", "C", "perl") used in writing the analyzer;
The type of analyzer source—text, binary ("C" or "C++"), or byte code ("java");
The "purpose" of this analyzer file—main, auxiliary, or make, and whether it is executable;
(Repetitions of the above four lines for each separate analyzer program file.)
The number of nodes that can be processed simultaneously; and
The sources of input in the form of a list of collector names or numbers.

As can be seen, the XML file set forth here defines completely how the analyzer harness 806 is to execute a particular analyzer after it wraps in a frame and sets it to examining the information relating to a particular node or series of nodes. This XML file may be thought of as a control program for the analyzer harness 806 that governs the execution of the corresponding analyzer 110.

Finally, at step 1216, all of the information just described is saved in the analyzer database 804 as part of the analyzer 110 definition.

One embodiment of the invention provides a number of optional but useful tools may be provided to the analyzer designer in the form of user interfaces and utilities. These are listed in FIG. 14:

A general utility facilitates the creation of new analyzers and the modification or deletion of existing analyzers at 1402 and is similar to such tools provided in any program development environment.

When one is done entering the information concerning an analyzer, an XML descriptor creation utility 1404 generates the XML file (such as that illustrated in Appendix C of the parent application) automatically.

Managers are provided at 1408 for program source code, auxiliary source code, and make files that are similar to those to be found in any general purpose program development environment. Additionally, a manager is provided to assist in creating template text files (such as that shown in Appendix D of the parent application) which includes provision for embedding variable space holders into such a text file. For example, an analyzer might pull out of a collector document a piece of information and then arrange for the information to be inserted at the variable insertion point within such a text-file template, so that the template contains node-specific information in addition to background boilerplate information defining a given issue.

To assist in managing the many collectors that may be available, a collector search facility 1410 is provided that facilitates searching through collectors both by the Unix or other command assigned to a collector (for example, "bdf") and also by the logical names and numbers assigned to a collector.

To facilitate the testing of analyzers, at 1412 there is provided a simple analyzer development environment which encapsulates an analyzer in a framework and provides it with live sample information obtained from editable stored samples of collector output files input so that a prototype analyzer may be tested in a safe environment to see how it performs.

A particularly useful tool is one that facilitates the creation of the lists of collector output configuration information files that are fed into the analyzers as their information input and that helps the designer to arrange the names of those collector output files in the proper order expected by the analyzers. This facility 1414 presents, in tabular form, a vertical list of analyzers on the left and a vertical list of collector reports on the right, and it permits one, by clicking the mouse, to connect each analyzer to one or more collector reports, and to indicate by the ordering of those connections the order in which collector reports are to be fed into each analyzer as arguments that are passed to an analyzer each time an analyzer is executed.

Another useful utility simply provides the designer with views of sample collector reports at 1416. Since the analyzers must go into those reports and extract text from the middle of the reports using programming commands, it is essential that the designers of the analyzers have access to sample reports so they can see how the text is positioned and then come up with the proper text extraction code for cutting excerpts out of the reports for analysis and for possible inclusion in the issue statements.

Finally, at step 1418, a manager is provided that groups analyzers into logical groups and thereby permits analyzers to be assigned to a particular assessment type. This tool facilitates the arrangement of analyzers such that when an auditor 813 performs task definition using the system 810, the auditor 813 may make an intelligent decision at step 1002 (FIG. 10) as to what task is to be performed and come up with an appropriate set of analyzers, which may be modified at step 1004 as has previously been explained.

Creating Template Reports

FIGS. 16–18 illustrate in flow chart manner the process of creating template reports and also the rules that govern the assembly of templates and that perform a high-level analysis of the issues identified by the individual analyzers. The ability of the system to generate readable, meaningful, summary management reports largely depends upon this portion of the system.

In the embodiment of the invention described here, a third party program (such as "Crystal Reports," obtainable from Krystal Decisions, Palo Alto, Calif. or "Business Objects" obtainable from Business Objects America, San Jose, Calif.) is used to transform template documents into finished reports under database control. Crystal Reports includes analysis tools that can examine trends, expose relationships, and zero in on important facts. It thus combines rules and report templates into a single "batch" oriented report generator that can be driven by the issues database transferred from XML file form into a Microsoft Access database system. Other rule and template based report generators can also be used, such as "Caps Author" and "Hot docs" (from Capsoft Development Corporation, Provo, Utah).

The setting up of these systems involves two aspects. First of all, the incoming information is presumed to be in some form of a database. In one embodiment of the invention, the database is Microsoft's Access database program. The XML issues file is simply read and its contents are fed directly into Access.

The template documents, designed in accordance with the report generator specifications, contain large amounts of boilerplate or background text. They may also contain embedded commands analogous to the programming language commands "if", "else", and "end if" which are used in programs to select which sections of code are to be executed or to be skipped over or performed in the alternative. In the case of document templates, these same types of commands determine which text ends up in a report and which boilerplate text is cut out and left on the cutting room floor.

Such report generators also provide for the generation of repetitive passages through the use of commands analogous to the "repeat" and "end repeat" language commands found in programming languages. Finally, templates may contain various types of placeholders for expressions which are evaluated and then inserted into the boilerplate to become part of the finished report.

In addition, most such systems have the facility to provide for separate rules which compute not only values to be inserted into the reports but also values that control the inclusion or exclusion of boilerplate text as well as the inclusion of repetitive insertions. These rule systems can be quite elaborate, constituting "backward chaining" expert systems which may include hundreds of rules and which may perform very detailed and elaborate analyses upon the incoming analyzer information which is presumed to be stored in a Microsoft Access database (any other database system on any platform could be used here). A final provision of these systems provides for the insertion of tables into the text of a report, where the tables are extracted from the Access database. For example, such a detailed technical issue report might include a table that summarizes each and every one of the issue reports generated through analysis (as is illustrated at the end of Appendix G of the parent application).

At the beginning of the process of report template creation, the first step at 1602 is to make available to the author of the report the symbolic names of the analyzer output information that is to be used both embedded into the report templates and also to control report template boilerplate selection. These information values necessarily come out of the analysis system. With reference to Appendix F of the parent application, Part 2 of Appendix F (of the parent application) presents the XML information output that comes from issues detected through the execution of analysis programs on configuration information gathered by collectors. This information structure is transferred into a Microsoft Access database from which the values can be retrieved using identifiers the same as or similar to those which appear in the XML information structure. Accordingly, the author needs to be provided with sample issue reports of the kind shown in Part 2 of Appendix F (of the parent application) for each and every one of the available analyzers and for each and every one of the issues that each such analyzer is capable of reporting. This information enables the template and rule author to come up with a set of rules which can analyze and summarize the issues database 112 information as well as pick up detailed information from there and incorporate it into any arbitrary type of report that may be necessary or desirable.

Using this information concerning the names of variables, at step 1604 the author develops a set of rules that can review the overall performance of an enterprise 300. The author, clearly, must be an experienced enterprise technical expert who knows what to look for in the issue information generated by a large computer enterprise installation and who knows how to write rules that will perform the same types of analyses that the expert himself or herself would have performed in person had they been able to go to the enterprise site.

Having developed rules to control report generation, at step 1606, the expert then moves on to develop a management summary report template that states, in a readable form, the general state of the system. This report ideally should be readable by lay individuals, such as the chief operating officers of the company that owns and manages the enterprise. It should point out general problems, and it should then give examples of why these problems merit the attention of management. It may then provide general overview suggestions as to how those problems should be managed. Built into this report is clearly the experience of an expert in enterprise system design and management. It may present cost estimates for configuration changes that can improve enterprise performance.

For the technical manager, the expert develops a different template that lists all the critical technical points in summary form, states their degree of criticality, and then presents brief explanations and costs estimates for their correction. This report will not include the background explanations needed by the lay managers. It will be much more concise and to the point, and it will also include a level of technical detail that is omitted from the previous report.

At step 1610, an additional template can be developed which produces a completely detailed presentation of all the specific issues for each of the nodes or groups of nodes that were analyzed. In addition to the statement of issues obtained directly from the analyzers, this report may include reasons why certain issues need to be addressed, costs of implementing changes, and possibly a detailed explanation of these issues, which may be through a hypertext linkage to other documents. Snippets of the actual collector configuration information may be included, as needed, to clarify an issue. As is illustrated in both Parts 1 and 2 of Appendix F (of the parent application), such snippets can be readily incorporated into the XML output of an analyzer and may then be passed out and included in the technical report to assist the technical experts in understanding any of the issues not addressed by the report generation rules.

Finally, at step 1612, it is desirable to develop a variety of master report templates intended for differing audiences and business needs that include varying combinations of the reports just described, as well as possible additional introductory and explanatory reports hyperlinked to background information. Thus, a single report may contain multiple parts destined for different individuals and may be printed and delivered as a unit to the owners and managers of an enterprise.

The report generation process, triggered by the auditor 813, is carried out by the report generator 206 which, in the embodiment of the invention described here, is the program "Crystal Reports". Referring now to FIGS. 19 and 20, the report generator 206 receives a list of reports from the assessment task 814 and begins by calling forth from the report template and rules database 204 the templates and rules needed for generating the desired reports, at step 1902. Next, at step 1904, the report generator 206 goes to the (XML) issues database 112 and obtains the necessary XML issues information that was generated by the analyzers 110, and it transfers this information content into a Microsoft Access database for convenient access and retrieval by the report generator 206. The report generator 206 also obtains from the task definition system 810 additional information about this audit, its author, and so on and transfers this information into the Access database for convenient retrieval by the report generator 206. Next, at step 1908, the report generator 206, again at the direction of the task definition system 810, may obtain directly from the tracker database 106 background information on the specific enterprise and nodes being audited for inclusion in the reports, placing this information into the Access database along with the rest. In addition, the list of enterprises, the list of nodes and the list of analyzers in the assessment task 814 can be added to the Access database and included in a report at an appropriate place.

Finally, at step 1910, the Crystal Reports program operates in batch mode as a template and rule processor controlled by the templates and rules and by the content of the Access database to generate all the necessary and required reports. This could also be a non-paper-based report such as a workflow management system.

The Analyzer Harness

Figure 22:
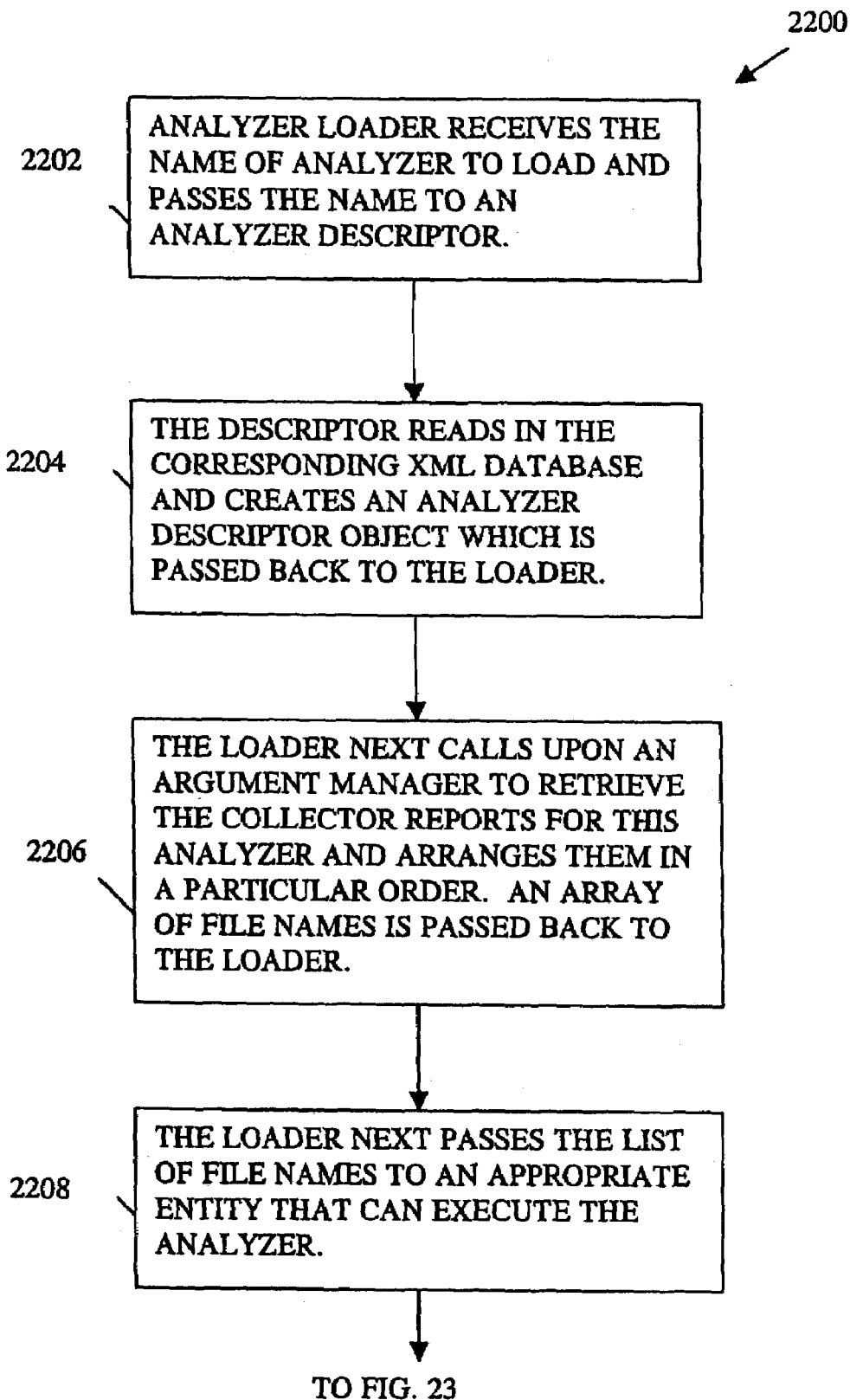
FIG. 22 presents a flow diagram of the detailed steps carried out by elements of an embodiment of the analyzer harness (shown in FIG. 21) when it executes an analyzer.
Figure 23:
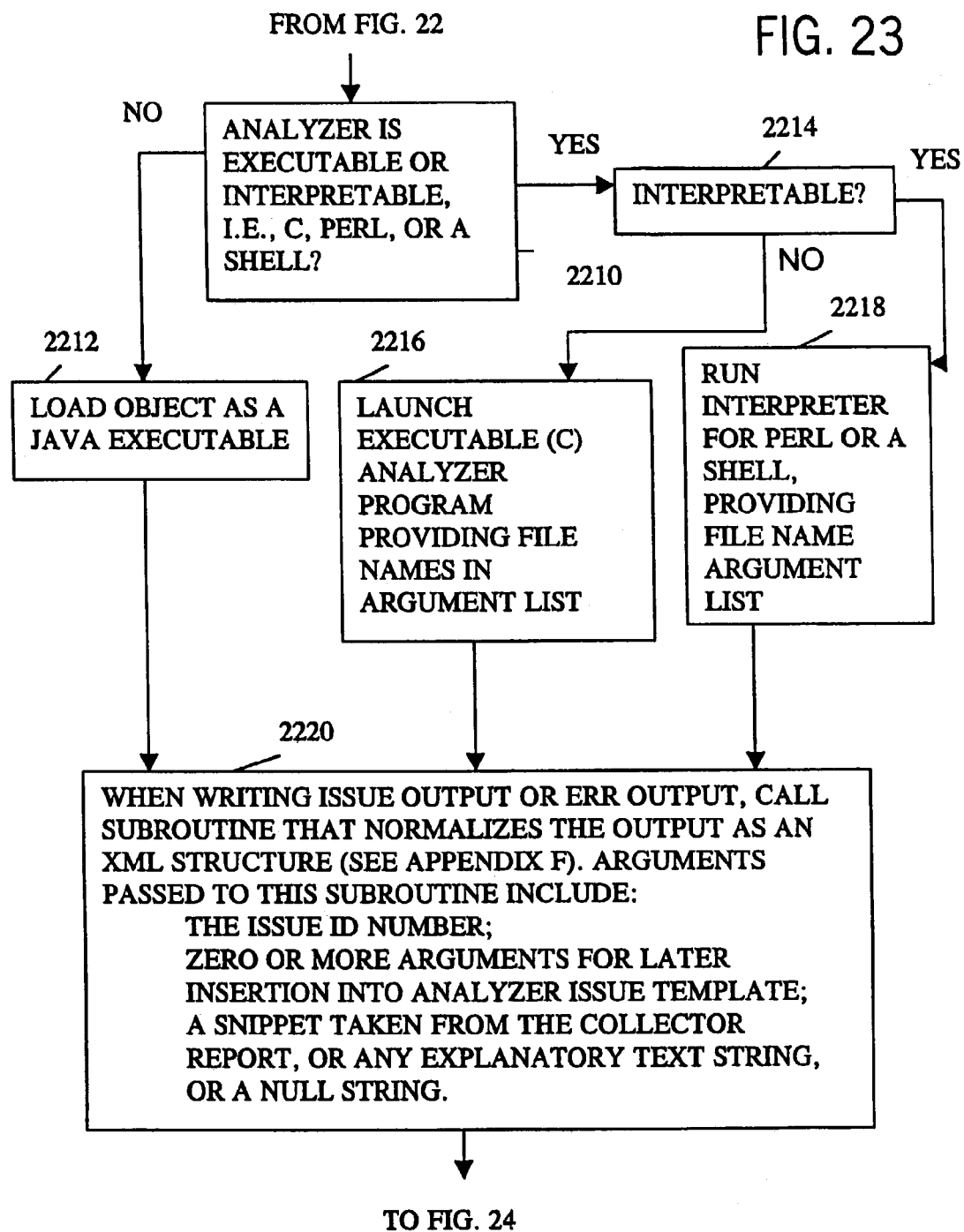
FIG. 23 is a continuation of FIG. 22 illustrating the steps carried out by the analyzer harness when it executes an analyzer.
Figure 24:
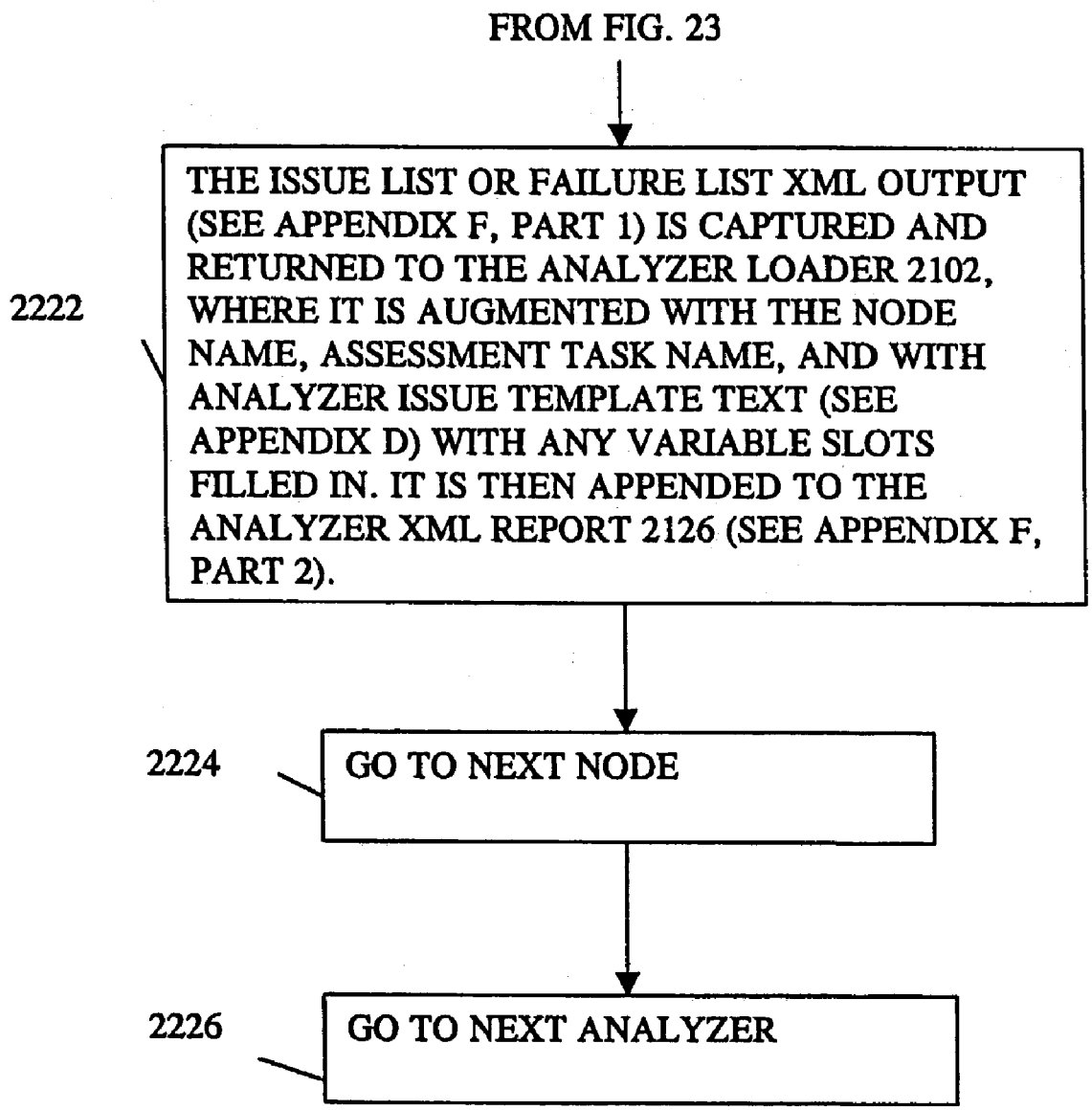
FIG. 24 is a continuation of FIGS. 22 and 23 illustrating the steps carried out by the analyzer harness when it executes an analyzer.

The analyzer harness is described from three different perspectives. First, FIG. 15 presents, in program flowchart form, the steps executed by the analyzer harness 806 and the analyzers 110 to illustrate in general terms how the individual analyzers are called upon to process information provided by the individual nodes. (FIG. 15 does not address the task of describing the complex interactions that occur between the individual analyzers and analyzer harness 806.) Secondly, FIG. 21 presents a software element block diagram that illustrates the precise relationship which exists between the three sub-components 2102, 2104, 2106 of the analyzer harness 806 and the various types of analyzers 2110, 2112, and 2114 supported in the embodiment of the invention described here. Finally, FIGS. 22–24 present a flow diagram of the steps that are carried out by the analyzer harness 806 components illustrated in FIG. 21, addressing the issue not addressed by FIG. 15.

Referring now to FIG. 15, the information processing operations carried out by the analyzer harness 806 are shown in a conventional software flow diagram. The process begins at 1502 when the task definition system 810 passes to the analyzer harness 806 the assessment task 814 that lists the enterprises, nodes, and analyses which are to be performed. This enables the analyzer harness 806 to set up a triple set of nested loops, as shown, branching back at step 1522 after each node is processed, after each analyzer is processed against every node, and after each enterprise is processed.

The overall process begins at step 1504 when a first enterprise 300 is selected. Then at step 1506, a first analyzer 110 is selected. Next, at step 1508, the definitions of the analyzer and information concerning how it is to be executed (see Appendices B and C) are retrieved from the analyzer database 804 along with the template (Appendix D of the parent application) containing issue messages for the analyzer. Next, at step 1510, the names of the collectors designated by that analyzer in the analyzer's XML descriptor (Appendix C of the parent application) are collected as an indication of where the input information is to come from. At step 1512, if the analyzer is computing a trend over time, then a designated set of times and dates or range of times and dates are also picked up.

Program control then commences at the step 1514, and the steps 1514 through 1522 are repeated for each node 302, etc. that is to be analyzed by this particular analyzer.

At step 1516, the names of the designated collector report files for this particular node are retrieved from the tracker database 106 and are listed as input arguments to the analyzer's execution. Then on step 1518, the analyzer code is actually executed in the context of the collector reports provided in this input argument list. At step 1520, if any issues or failures arise, the analyzer generates small XML reports and returns them to the analyzer harness 806 which augments them with information such as the name of the node and the template issue text (See Appendix D of the parent application). Looping then proceeds from step 1522 until all of the nodes are processed by this analyzer.

Next, the analyzer harness 806 moves on to the next analyzer and repeats steps 1506 through 1522 until all of the analyzers have been processed. It moves on to the next enterprise and repeats the steps 1504 through 1522 until all of the enterprises have been processed, if there is more than one.

When processing is complete, at step 1524, the analyzer XML output report is stored as a file in the (XML) issues database 112.

Referring now to FIG. 21, a detailed illustration of the structure of the analyzer harness 806 is presented that illustrates its relationship to the analyzers and also illustrates how the various different types of analyzers are processed. This figure will be discussed in the context of the flowchart of analyzer harness operation presented in FIGS. 22–24.

In FIG. 21, the analyzer harness 806 is shown to have three major components. An analyzer loader 2102 is the primary component that manages the loading and execution of the analyzers during the processing of configuration information. This analyzer loader 2102 calls upon an analyzer descriptor 2104 to obtain from the analyzer database 804 the XML information for a particular analyzer 110 and to put that information into a database from which the analyzer loader can have easy access to it as it determines how to harness and encapsulate into a framework a particular analyzer 110 that is to be executed. The analyzer loader 2102 also calls upon an argument manager 2106 to reach out into the tracker database 106 to find collector reports 2108 and to arrange for those reports, or the file names for those reports, to be passed as incoming arguments to the analyzers 110 when they are executed by the analyzer loader 2102. The loader 2102, being written in "java", executes "java" executable analyzers 2110 directly. It calls upon a standard operating system "shell" utility to execute analyzers 2112 written in the "C" or "C++" programming languages. It calls upon an operating system interpreter to interpret and execute analyzer written in "perl" or "kshell" or other interpretive languages 2114. The output of an analyzer is shown to be an XML output at 2124 which is generated by special XML output sub-routines 2116 that are called by the analyzer 110 regardless of its form to generate XML "issues" output messages and also error output messages. The output 2124 does not include identification of the relevant node, nor does it include textual information about an issue, since that information is not available to the analyzers 110 when they are executing. Accordingly, the analyzer loader 2102 accepts the XML output of the analyzers 2124 and generates an expanded XML report 2126 that include the issue defining language taken from the analyzer issue templates 2122 as well as the identification of the node being processed and also the name of the assessment task 814. This may be seen in Appendix F (of the parent application), where the XML output of an analyzer 110 is shown in Part 1, and the XML report 2126 of the analyzer loader 2102 is shown in Part 2 for the simple analyzer that has been used as an exemplary analyzer throughout this patent application.

Referring to FIGS. 22–24, the process of the analyzer harness 806 executing an analyzer 110 will be described. At step 2202, the analyzer loader 2102 (FIG. 21) receives the name of an analyzer 110 that it is to load and process. This corresponds generally to the step 1506 shown in FIG. 15. The loader passes the name to an analyzer descriptor program 2104.

At step 2204, the analyzer descriptor program 2104 locates and reads in the corresponding XML database for the analyzer (see Appendix C of the parent application) and thereby creates in its own internal information structure an analyzer descriptor object which is passed back to the analyzer loader 2102.

At step 2206, the loader 2102 next calls upon the argument manager 2106 to retrieve from the tracker database 106 the appropriate collector reports for the collectors designated in the descriptor object for a particular node (designated in step 1514 of FIG. 15). The collector reports 2108 are identified by file name, and these file names are organized in order as an input argument list for the analyzer 110 to read these files in order and process them. The file names are passed back to the loader 2102.

Finally, at Step 2208, the analyzer loader 2102 calls upon an appropriate entity to execute the analyzer 110 in accordance with the nature of the analyzer, passing the list of file names as an input argument.

Referring to the top of FIG. 23, the XML analyzer information which now resides within the descriptor object is now referred to in an effort to determine what kind of analyzer is at hand. At step 2210, if the analyzer is written in "java," then it is simply called as a "java" subroutine, and it is passed the input list of file names as an input argument at 2212. If the analyzer is not written in "java", then step 2214 checks to see if it is interpretable. If so, then an appropriate interpreter for "perl" or "kshell" is run at step 2218, and again the input argument list of file names is passed to the interpreter as input for the execution of the analyzer 110. Finally, if the analyzer is not interpretable but is executable, as in the case of a compiled "C" or "C++" program, then at 2216 an operating system "shell" utility is called upon to launch the executable analyzer program, again providing it with the list of file names as an input argument to the executing program.

Thus wrapped by the harness 806 in a framework that includes input collector configuration information files obtained from the appropriate node 302, the analyzer 110 performs its tests and thereby checks to see if any issue reports need to be generated. If so, or if any errors occur, the analyzer calls upon special routines 2116 that normalize the analyzer output as XML structures such as that shown in Part 1 of Appendix F (of the parent aplication).

The arguments passed through the output routine 2116 include:

The issue ID number;

Zero or more arguments for later insertion into analyzer issue templates 2122; and An optional snippet taken from a collector report, or an explanatory text string, or a null string.

At step 2222, the issue list or failure list XML output (See Sample 1 in Appendix F of the parent application) is captured and is returned to the analyzer loader 2102 in the form of an XML output 2124. At step 2222, the analyzer loader 2102 expands the size of this XML output by adding to it information defining the name of the node 302 from which the collector configuration information came, the name of the assessment task 814 launched by the auditor 813, and other such background information. The analyzer loader 2102 also retrieves the analyzer issue templates 2122 (Appendix D of the parent application) for this analyzer from the analyzer database 804 and from this set of templates retrieves, by number, the particular text template that identifies and corresponds to the particular issue which triggered the XML output. If there are any variable space holders in that text template, the analyzer loader 2102 looks to the XML output 2124 to see what value is to be inserted at that point, and it inserts the value into the template, transforming it into an issue message. The analyzer loader 2102 then generates a new segment for a growing output XML report 2126 that includes all of the above added information added to the analyzer XML output 2124. A sample of such a report can be seen in Part 2 of Appendix F (of the parent application).

The analyzer loader 2102 then proceeds on to the next node at step 2224 and continues until all of the nodes have been analyzed by this particular analyzer 110. It then proceeds to the next analyzer 110 at step 2226 and thereby continues until all of the analyzers have been processed against all of the nodes. The XML report 2126 is then stored in the (XML) issues database 112 where it is made available to the report generator 206, as has been explained.

Hierarchical Organization of Analyzer XML Information 2118

An analyzer, as described above, comprises four parts: A textual description of the analyzer and its functions (See Appendix A of the parent application), the source code of the analyzer 2120 (See Appendix B of the parent application), the template 2122 text which defines the issues of an analyzer (See Appendix D of the parent application), and an XML file that defines, for the analyzer harness 806, how the analyzer is to be processed and what information it requires.

In a variation of the invention, which has been suggested above but has not been fully described, the analyzers 110 may be organized hierarchically to correspond to various broad and narrow arrangements or sets of managed elements within a given enterprise. For example, in FIG. 10, where the assessment tasks are defined, the assessment types are broken down into overall, hardware/operating system, networking, file management and storage, and so on. These assessments each correspond to a particular set or collection of managed elements. These sets can be still further subdivided. For example, as shown in FIG. 25 at 2502, the file system can be broken down into logical volumes, file system usage analysis, and logical volume management. Similarly, hardware may be broken down into memory, CPU, and other categories. Networking can be similarly subdivided.

To facilitate these types of assessment audits of the subparts of a large system, an XML control file can be created which includes, as its base or lowest elements, all of the links to the analyzer XML definitions of other sub-components of an audit contained in the analyzer database 804. This XML file might include, as its main heading, "Enterprise", or some such general title; and it might then have links to the XML files for secondary headings such as "Operating System", "File System", and so on. Then each of these subheadings could be linked further to sub-subheadings, and so on such that many different possibilities for audits through various collections of managed elements of the enterprise can be contemplated. This XML file (indicated symbolically in Appendix G of the parent application) then becomes a major tool for controlling the operations of the analyzer harness 806, causing it to do a particular auditing on a particular collection of managed elements. No changes will be needed by the framework to handle these multiple combinations of assessments when this is implemented. The only changes that are needed involve the set of analyzer/heading definitions contained in the XML files which can be swapped in and out without affecting the framework.

The actual hierarchy would actually be created by links in the assessment type XML file to the Operating System, File System, . . . components which would in turn have links to their sub-components, until the link to the actual analyzer is reached.—(See Appendix H of the parent application.)

Figure 26:
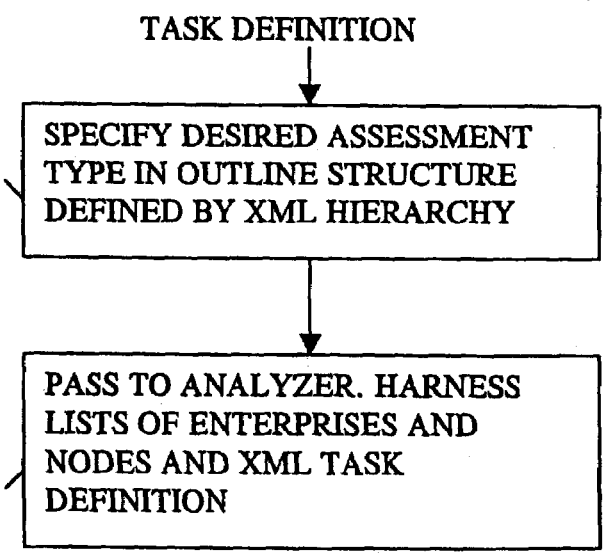
FIG. 26 illustrates a process of defining a task in the environment of the XML hierarchy shown in FIG. 25.

Accordingly, one achieves the conceptual assessment XML hierarchy shown at 2502 in FIG. 25 with little change to the current harness. Then, in FIG. 26, the task definition system 814 is modified such that at step 2602 (which replaces step 1002 in FIG. 10) one merely specifies a desired assessment type in the outline structure defined by the large XML structure 2502 shown in FIG. 25. This task assessment type corresponds to a set of managed elements which correspond to a subpart of the XML hierarchy shown in FIG. 25 and which contains all the analyzers 110 for the set of managed elements. Note that the XML data 2118 (see Appendix C of the parent application) for the "Disk Usage" analyzer appears beneath "File System", "Logical Volumes", and "File System Usage Analyses" in the exemplary XML structure shown symbolically at 2502 in FIG. 25. At step 2604 (which replaces step 1502 in FIG. 15), one simply passes to the analyzer harness 806 the lists of enterprises and nodes, along with the larger XML structure 2502 that includes, as a substructure, the list of the analyzers that are to perform in accordance with FIG. 25, including the portion of the XML structure in FIG. 25 which the auditor has designated for execution. The analyzer harness 806 then carries out these assessments automatically, covering as much or as little of the system hardware and software as the auditor desires to have covered in any given analysis operation, controlled entirely and continuously by the XML structure of FIG. 25 and by that portion of this structure which the auditor has designated for execution.

Description of the Analyzers 110

Figure 27:
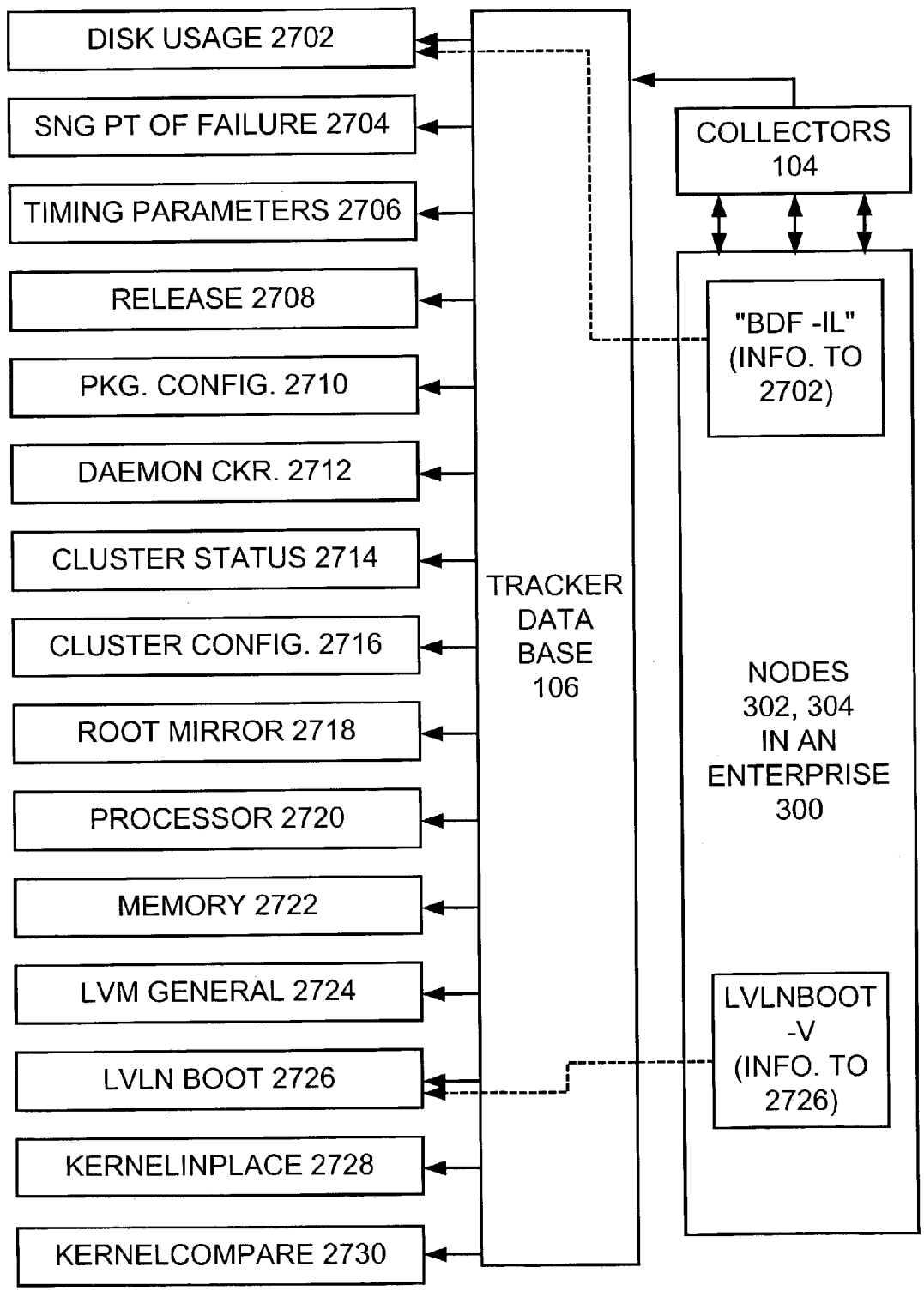
FIGS. 27 and 28 together present the analyzers contained in an embodiment of the invention and illustrate how the collectors supply the analyzers with information.
Figure 28:
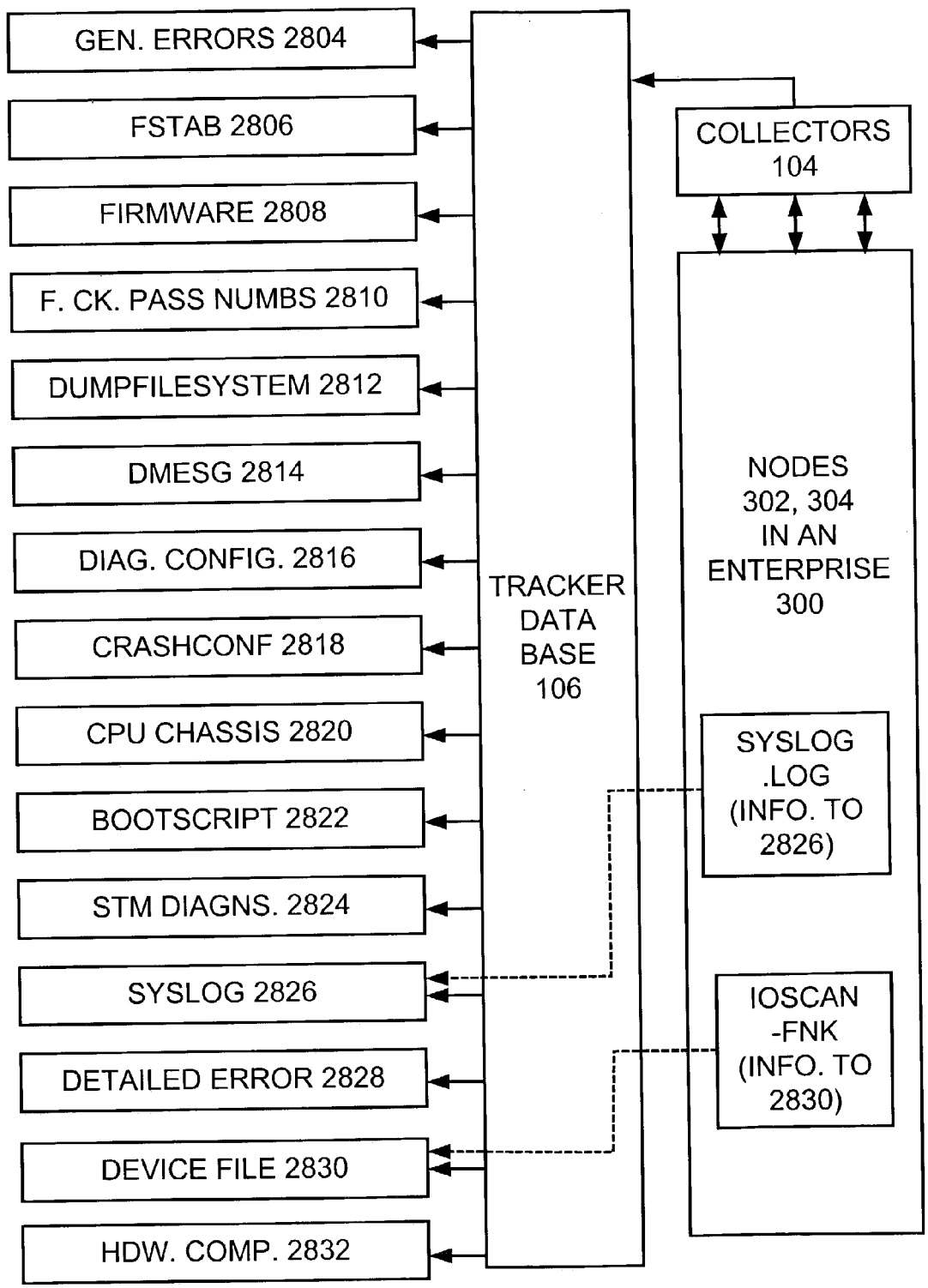

In addition to the "disk usage" analyzer 2702 (FIG. 27) which has been used as an exemplary analyzer throughout this specification, various embodiments of the invention may include varying combinations of a number of additional analyzers which are described below as examples of the many possible analyzers that can be created. Many other types of analyzers can also be developed. These are illustrated in FIGS. 27 and 28 and are described below.

Single Points of Failure Analyzer 2704

This analyzer checks to ensure that there are both a primary boot disk and an alternate boot disk. Further, this analyzer checks to ensure that the primary boot disk and the alternate boot disk are not installed on the same hardware path. Thus, an issue is flagged when there is a primary disk installed without an alternate disk. Also, an issue is flagged when the primary and alternate boot disks are installed on the same hardware path.

MC/Serviceguard Timing Parameters Analyzer 2706

This analyzer inspects the MC/ServiceGuard timing parameters for accuracy and supportability. The following issues are flagged: an issue is flagged when the value of NODE_TIMEOUT is set to the default value, which is typically two seconds; an issue is flagged when the NETWORK_POLLING parameter is configured to be greater than or equal to the NODE_TIMEOUT parameter; an issue is flagged when any of the values of HEARTBEAT_INTERVAL, NODE_TIMEOUT, AUTO_START_TIMEOUT, and NETWORK_POLLING_INTER-VAL is set below a predetermined value, which predetermined value is typically a time less than or equal to one second; and an issue is flagged when the value of the NODE_TIMEOUT is set to less than at least twice the value of the HEARTBEAT_INTERVAL parameter.

MC/Serviceguard Release Analyzer 2708

This analyzer checks the installed MC/ServiceGuard version on all nodes and ensures that the latest version is installed for a specific release of HP-UX (Hewlett-Packard, Inc.'s version of Unix) and that it is the same on all nodes in the cluster. An issue is flagged when MC/ServiceGuard does not appear to be installed, when there is a newer version of MC/ServiceGuard available for the operating system, or when any node in the cluster is running a different MC/ServiceGuard release than the others.

MC/Serviceguard Package Configuration Analyzer 2710

This analyzer checks the configuration of the packages within a MC/ServiceGuard cluster. An issue is flagged when the default package subdirectory does not exist, when the package switching is disabled, or when separate package control run and halt scripts exist for the package.

MC/Serviceguard Daemon Checker 2712

This analyzer checks to determine whether or not the MC/ServiceGuard daemon(s) are running. Using a daemon, a program can simply hand off data to a smaller program and go on to other work. Where the MC/ServiceGuard daemon 'cmcld' is not running on the node in the cluster system, an issue will be flagged.

MC/Serviceguard Cluster Status 2714

This analyzer checks the MC/ServiceGuard cluster status, node status, and package status. An issue will be flagged if: the cluster is down, the cluster is running on a subset of the nodes, one or more packages of the cluster are not running, global package switching is disabled, a package has node switching disabled for one or more nodes, a package is not running on its primary node or when no alternative node is available to which the package can be switched.

MC/Serviceguard Cluster Configuration Analyzer 2716

This analyzer checks the configuration of the MC/Switch-Guard cluster for correct configuration. An issue will be flagged when: the ASCII (American Standard Code for Information Interchange) configuration file is not found at the default location and/or with the default name, when the ASCII configuration file does not correspond to the binary cluster configuration file, when the ASCII cluster configuration file is not the same on all nodes in the cluster, when the binary cluster configuration does not exist on one or more nodes in the cluster, when the binary cluster configuration file is not the same on all nodes in the cluster, or when incorrect ownership and/or permissions exist on the binary cluster configuration file.

Root Mirror Analyzer 2718

This analyzer verifies that the root volume is mirrored at least once, ensures that each mirror is bootable, ensures that an entry exists in /stand/bootconf for each mirror, and checks for single point of failure related to the boot disks. An issue is flagged when: there is no mirror found for the root logical volume, the boot mirror device is missing from /stand/bootconf, there is a nonbootable mirror of the root drive, there is a primary boot disk installed without an alternate disk, or the primary and alternate boot disks are installed on the same hardware path.

Processor Analyzer 2720

This analyzer extracts information from the CPU (Central Processing Unit) hardware logs of each processor installed in the system. CPU specific information gathered includes the number of processors installed, PDC (Processor Dependent Code) revision level, the hardware model number (translated into English for the report), the processor chip revision, and the slot number in which the processor(s) are installed. In addition, the analyzer gathers HPMC (High Priority Machine Check) error information specific to the CPU, Memory, and I/O (Input/Output) error logs. Also, the analyzer identifies that the processor fast boot status flag has been set, which indicates that the memory self-test has been disabled during the system self-test portion of the PDC boot code. Processor chip revision is gathered, and may be used to proactively identify processors associated with class problems and/or known defects. An issue is flagged when: the processor PDC revision level is not the latest supported revision, a valid HPMC exists in the hardware logs, a valid memory error exists in the hardware logs, a valid fatal I/O error exists in the hardware logs, or if the fast boot flag has been set.

Memory Analyzer 2722

This analyzer checks for the existence of single and double bit errors in the hardware logs, and also verifies the number of available entries in the page deallocation table (PDT). An issue is typically flagged if: a single-bit memory error exists and its count is greater than or equal to 1000, a double-bit memory error exists and its count is greater than or equal to 1, or the number of PDT entries used exceeds 50% of the PDT total size, which by default is set to a maximum entry value of 50.

LVM General 2724

This analyzer does basic tests on the LVM (Logical Volume Management) configuration such as comparing the content of /etc/lvmtab with the output of the lvm (logical volume management) commands in order to find volume groups, or physical volumes not activated or incoherencies. Also, it may run basic checks for each volume group, physical volume or logical volume. An issue will be flagged if: not all the volume groups listed in lvmtab (logical volume management tab) are activated, not all the physical volumes in a VG (Volume Groups) are currently active, a physical volume is missing in /etc/lvmtab, an activated VG is not defined in /etc/lvmtab, not all the volume groups listed in lvmtab are activated, or bad block relocation is not set to NONE for LV (Logical Volume) on EMC (Electric Machine Control, Inc.) drives.

LVLN Boot Analyzer 2726

This analyzer verifies the data reported by lvlnboot. "lvlnboot-v" displays the root, boot, swap and dump lvm configuration of an LVM enabled boot device. An issue is flagged if no dump device(s) has been configured. The analyzer may, where desired, verify Boot, Root, and Swap also.

Kernel in Place 2728

This analyzer verifies that standard and backup kernel files are in place. An issue is flagged when: a standard kernel file is not in place, a standard backup kernel file is not in place, or a standard kernel could not be identified as a kernel.

Kernel Compare 2730

This analyzer compares and displays differences between kernel parameter settings for a list of hosts. An issue is flagged if some kernel parameters have different values.

General Errors Analyzer 2804

This analyzer analyzes general errors and I/O error entries in the command line Support Tool Manager, i.e.: CSTM-logfile. (CSTM is an online support tool platform which operates under the control of the hp-ux Operating System. It provides automatic configuration mapping, a set of device verifiers, exercisers, information modules, expert tools, utilities, and firmware update tools for the system components and peripheral devices that are installed on hp-ux systems. The I/O error entries are part of the CSTM information module. The I/O error entries log specific device performance information for devices and system components which are exhibiting abnormal operational behavior.) The issue will typically be flagged if: the number of uncorrectable errors logged for a DLT or DDS tape drive device is greater than or equal to one, it has been less than 30 days since the data and time of the last entry in the formatted raw logfile (if not flagged, the analyzer is aborted), the number of overtemp entries is greater than or equal to one, the number of I/O error entries for the system components or peripheral devices is greater than or equal to ten, or the number of LPMC (Low Priority Machine Check) entries is greater than or equal to ten. In PA-RISC system architecture, there are recoverable and non-recoverable hardware errors. Detection of an HPMC (High Priority Machine Check) by PDC (Processor Dependent Code) is a fatal error which immediately stops the further execution of instructions by the CPU hardware. An LPMC is a recoverable error in the Main Memory of CACHE components of the CPU. When an LPMC occurs, a combined interaction between PDC and the hp-ux Operating System identify the type of recoverable error that occurred, triggers PDC code to execute a hardware retry to fetch critical data from the supplying hardware component and reinsert the date into the component at fault, to log the event that occurred, and then to re-initiate normal system operation. The LPMC is therefore a mechanism which provides a "hardware retry" of certain processor and memory errors which are not classified as fatal.

Currently, this analyzer is capable of analyzing, detecting, and reporting the presence of system hardware abnormalities and I/O errors.

FSTAB Analyzer 2806

This analyzer checks the file systems in /etc/fstab for problems and checks whether they are correctly configured. An issue will be flagged if: a file system listed in /etc/fstab is not mounted, a file system is mounted that is not included in the /etc/fstab file, there is a conflict in the file system mount order, or a CDFS (CD file system) file system is mounted via /etc/fstab.

Firmware Analyzer 2808

This analyzer verifies the firmware revision of all devices with write-able firmware that are installed in, and attached to, the system, including: internal and external SCSI (Small Computer Systems Interface) hard disks, disk array controller modules, internal array SCSI disk modules, and the status of fans, power supplies, batteries, DRAM (Dynamic Random Access Memory), and NVRAM (Non-Volatile Random Access Memory) on array controllers and array chassis. Also, where desired, this analyzer may be used to verify that each device is a supported Hewlett-Packard product.

The FIRMWARE ANALYZER typically flags an issue if: the product is not a supported Hewlett-Packard product, the firmware revision of the disk is not the current release, there are read, write, verify or non-medium errors logged on a SCSI disk and the number of errors is greater than or equal to one, if there is a bad status for an array fan, power supply, battery, DRAM, or NVRAM, or if the disk array is a Model 12 Hewlett Packard ("HP") product. Unlike older models of HP arrays, the Model 12 can operate properly with internal SCSI disk modules that do not contain the current revision of device firmware. This is accomplished by the array controller firmware which is a separate hardware component from the internal disk modules. If the analyzer detects a Model 12, it performs only checks on the array controllers and aborts the firmware checks on internal disk modules.

File System Check Pass Numbers Analyzer 2810

This analyzer checks that the file system pass number parameters are correctly configured and supportable. An issue is typically flagged if: the file system check pass number is set to zero, the file system check pass number for the root file system is set to zero, the file system check pass number for non-root file systems is set to one, the file system check pass number is missing, identical pass numbers for file systems are on the same disk drives, or file system check pass numbers are not optimized for parallel fsck (file system check).

Dumpfilesystem 2812

This analyzer checks that the file system used by savecrash is large enough. An issue is flagged when no dump device is configured or when the file system too small for a dump. The size of the file system that may be used to save the dump is checked, taking into account a compression of 75% if compression is enabled, and a kernel of 80 Mb. The calculation is made on the worse case based on total memory size.

DMESG Analyzer 2814

This analyzer captures system error messages from dmesg (a UNIX command that displays the contents of a circular buffer that contains diagnostic information). Also, this analyzer verifies that there is support for capturing the dmseg output incrementally to ensure that none of the system buffer information is lost. If the support for capturing this information exists, the analyzer verifies that it is configured correctly. An issue is flagged if: there is no entry in the crontab file (a configuration file to schedule tasks in UNIX to run commands at specific times) to incrementally capture the dmesg output, if there is an entry in the crontab to capture the dmeswg, but it is not being written to the default location, there is an entry in the crontab to capture the dmesg, but the interval to collect it is greater than a predetermined recommended value, or there is an entry in the crontab to capture the dmesg output, but the execution of the dmesg command does not capture the incremental changes.

Diagnostics Configuration Analyzer 2816

This analyzer checks whether or not online diagnostics have been installed and are running. An issue will be flagged if: the online diagnostics are not installed completely, one or both diagnostic daemons (Diagmond and Memlogd) are not running, or the version of diagnostic software is not the latest released revision.

Crashconf Analyzer 2818

This analyzer is one of the required checks which, when combined with the other appropriate analyzers, will ensure that the system is configured correctly to perform a successful system dump. An issue will be flagged if: the system dump device(s) fail to have adequate space to hold the system dump, or the minimum necessary classes have not been enabled in fastdump.

CPU Chassis Analyzer 2820

This analyzer checks the internal processor hardware logs and reports on the status of the CPU fans, power supplies, and CPU processor module de-configuration. The de-configuration state of a processor module is archived in the internal processor hardware logs. The possible states are "C" which indicates the processor module is configured and operating normally, and "D" which indicates the processor module has been de-configured by the PDC as a result of the occurrence of a PDC detected hardware error. There is an additional subset of the de-configuration status flags (RS) which monitors if the CPU processor module has been de-configured by the PDC as a result of a recoverable non-fatal hardware error, or if the CPU processor module has never been re-configured by the PDC after physical replacement. If the RS flag is set, it indicates that the state of the processor is currently de-configured, but is pending reconfiguration and activation by physically restarting the system. Since it is possible for multiple CPU processor modules, fans, and power supplies to be installed in a CPU chassis, the physical location of each failed component is also reported.

An issue will be flagged if: the CPU processor modules that are installed have a "D" status bit set, if the CPU processor modules that are installed have both "D" and "RS" status bits set, if the "F" (failed) status bit for a cabinet fan failure is set, or if the "F" status bit for a cabinet power supply is set. The "D", "RS", and "F" status bits will only be set by the PDC if the CPU module, fan, or power supply is physically installed in the system processor chassis.

Bootscript Analyzer 2822

This analyzer verifies that the boot configuration scripts in /etc/rc.config.d have optimal configuration for an HA (High Availability) system. Where desired, this analyzer may only check the crashconf and savecrash configuration, but it is desirable to check all boot scripts. An issue will be flagged if: crashconf is not configured to run, savecrash is not configured to run, savecrash is not configured to run in the foreground, at least one dump device fails to be configured, the dump devices fail to be large enough for a full dump, the dump devices fail to be large enough for a dump, or the dump devices are unable to hold all physical memory.

STM Diagnostics Analyzer 2824

This analyzer verifies that the diagnostic software is installed, has the latest version and it reports if some of the devices are not supported by the installed revision.

Syslog Analyzer 2826

This analyzer scans the system logging file, normally /var/adm/syslog/sylog.log for specific patterns that usually indicate an issue. It looks for problems related to the MC/ServiceGuard cluster lock, Critical and serious EMS notifications, SCSI hang, error or reset messages, and warnings related to the crash dump configuration.

Detailed Error Analyzer 2828

This analyzer scans the detailed error log for I/O errors, groups them by hardware component and class of error, and generates an issue if the error count is above an acceptable threshold. The analyzer looks only to entries logged during the last 30 days. The analyzer also generates an issue if nothing was logged during that 30 day period, as this may indicate that the logging process is not operational.

In addition, issues are generated if entries are badly formatted, or if they are not properly decoded by the diagnostic subsystem.

Device File Analyzer 2830

This analyzer examines the output of the ioscan -fnk' command for i/o devices configured by the hp-ux kernel, and it also compares this output to the devices reported by the diagnostic subsystem and to the device files available on the system.

It generates an issue for disks for which no device file exists, or for which exists having a name following the standard naming convention.

Issues are also reported if a device is not claimed by the software or is reported with an unexpected status by 'ioscan'. Issues are also reported if a device is seen by the diagnostics but is not configured in the kernel.

Hardware Comparison Analyzer 2832

This analyzer compares the configuration of a list of systems and generates issues if one item of comparison does no match all systems. The comparison is done of the memory size (retrieved from the diagnostics), the number of processors (saved in the file /var/tombstones/cpumap) and the model of the processor (retrieved by the /usr/bin/model command).

Static and Dynamic Assessment

A second embodiment of the invention will now be described. In this second embodiment, an assessment is performed not only when a human Auditor 813 (see FIG. 8) decides when to do one, but also an assessment can be performed when a "trigger" (or triggering event) occurs. Such a trigger that would cause an assessment to be performed may be arranged to occur: 1) on a regularly scheduled basis (e.g., at the first of every month), 2) when a particular external event occurs (e.g., when data is written into a particular memory region of a node in response to a particular operating system error condition arising on that node, or when a particular hardware event has occurred on a node such as a processor high temperature event or a power failure event), 3) or manually, initiated by a user acting through a user interface. An assessment that is performed in accordance with the second embodiment can be proactive or reactive in nature, depending upon what causes the assessment to be performed. In the first embodiment, described above, the Auditor 813 determines when to perform an assessment, and in that sense all generated assessments are proactive in nature. In this second embodiment, the assessment framework is extended beyond that of the first embodiment, so that other processes besides a user interface operated by the Auditor 813 can trigger the creation and the execution of an assessment at various times, as will now be described.

In the second embodiment, prior to an assessment being performed, it may be customized in a "dynamic" manner. Any subset of an assessment, or a full assessment, may be run at any time and by any partner trigger. In that regard, the assessments framework manages the control flow of the assessment while the "partner" manages the input data specifying an audit request (also called an assessment task definition) that is to be used in the assessment.

Like the first embodiment, in the second embodiment an assessments framework, which comprises, inter alia, an analyzer harness 806 and an analyzer database 804 as shown in FIG. 8 for example, control the execution of an assessment task done entirely by the assessments framework. For each assessment or assessment task 814 to be run, there is a set of steps (or data services) that are to be performed by the assessments framework to complete the assessment task. This particular sequence of steps may be defined in a "Policy" as discussed further herein. In this manner, individual assessment tasks can be created and defined using unique policies, and the assessment tasks can then be triggered outside of a user interface (e.g., outside of a graphical user interface). A batch processing interface allows the tasks to be completed on a triggered basis, whereby a predetermined elapsed time may be the trigger, or whereby an occurrence of a particular external event may be the trigger.

Figure 29:
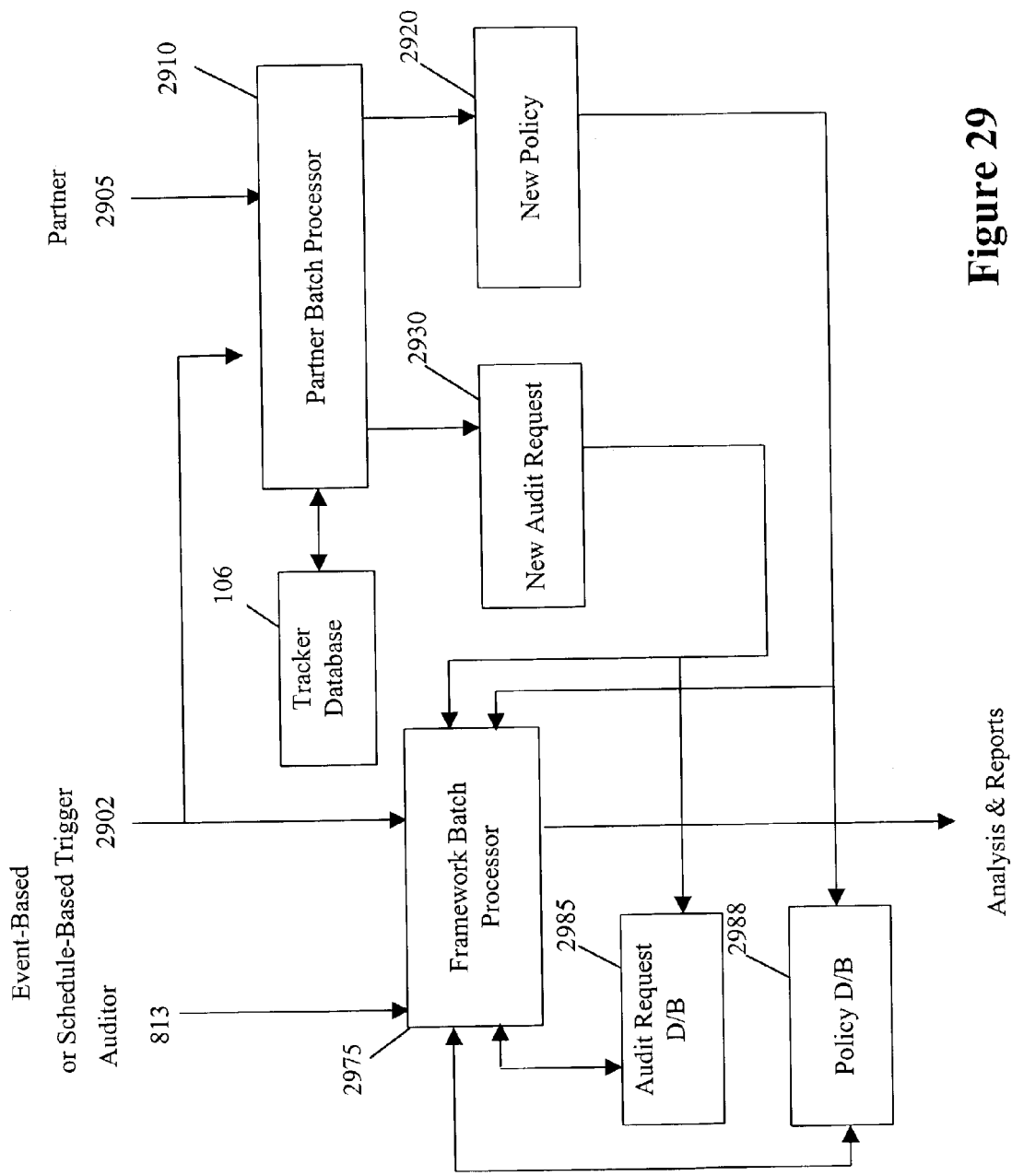
FIG. 29 illustrates a modified processing structure according to a second embodiment of the invention.

Unlike the first embodiment, the set of steps to be performed in an assessment does not have to be hard coded beforehand based on a particular assessment chosen by an auditor 813. Rather, a partner that is writing an assessment is provided with the capability to select a particular sequence of steps (e.g., analysis steps and reporting steps) for a particular assessment or assessment task 814 that is to be run against a particular list of enterprises and a particular list of nodes. In the second embodiment, as shown in FIG. 29, a partner batch processor 2910 provides an interface that allows a partner 2905 to create a dynamic (or new) audit request 2930 and a dynamic policy 2920 to go with the audit request 2930, as well as to select any triggers for initiating an assessment that is created by the partner 2905. The partner batch processor 2910 can be used to create a dynamic assessment or a static assessment. With this information provided to it, the assessments framework performs an assessment just like it would if the assessment was initiated by an auditor 813 from a user interface that allows the auditor 813 to select a task definition (e.g., the task definition A 814 in FIG. 8) to be used in the assessment, as in the first embodiment. In FIG. 29, the framework batch processor 2975 corresponds to the assessments framework (elements 804 and 806 in FIG. 8) described above.

The assessments policy 2920 may be created by the partner 2905 writing a software program using XML code, but other ways of creating an assessment policy may be envisioned while remaining within the scope of the invention. For example, the partner 2905 may be provided with a graphical user interface (not shown) to the partner batch processor 2910, whereby the partner 2905 may be given a list of potential triggers and policy steps (or data services) to choose from. From these lists, the partner 2905 makes desired selections in order to create a specific assessment policy and audit request, and this information is then converted to XML code and is stored in an audit request database 2985 and in a policy database 2988, to be input to the assessments framework (the framework batch processor 2795) when the appropriate triggering event occurs. The audit request database 2985 also stores static audit requests, which are retrieved by the framework batch processor 2975 when performing a static assessment. The policy database 2988 also stores static policies, which are retrieved by the framework batch processor 2975 when performing a static assessment.

A task definition (also called an audit request) may be a static task definition, obtained from a pre-existing list of task definitions, or it may be a dynamic task definition such as one that determines the current state of enterprises and nodes on the system and that then generates a list of enterprises and a list of nodes from this current information. In either case, the partner 2905 is provided with a mechanism to create a dynamic audit request and also a dynamic policy based on a specific triggering event.

One possible triggering event may be that a particular hardware error has occurred on a particular remote server. By way of the second embodiment, the detection of the hardware error results in the initiation of an "operating system" assessment of the remote server (it being a particular node in a particular enterprise), for example. The running of this assessment is done by the partner batch processor 2910 generating and delivering an audit request and policy and sending them over the paths leading to the framework batch processor 2975, as shown in FIG. 29. In particular, the dynamic assessment policy 2920 and the dynamic audit request 2930 for the assessment to be executed are output from the partner batch processor 2910 to the framework batch processor 2975 upon the occurrence of a triggering event 2902, whereby that same triggering event causes the framework batch processor 2975 to read in the dynamic assessment policy 2920 and to read in the dynamic task definition of an audit request 2930. The execution of the dynamic audit request 2930 preferably utilizes information obtained from collector reports 2108 stored in the Tracker Database 106 (see also FIG. 21) to identify the relevant enterprises and nodes. The trigger 2902 may be initiated by a scheduler (not shown), which provides year, date and time of day information that is used to determine if a scheduling trigger has occurred.

In the second embodiment, an assessment can be run as a batch process on a scheduled basis, whereby automatically generated reports are output by the batch assessment. The framework batch processor 2975 is an entry point into batch processing for a static assessments framework according to the second embodiment, and the partner batch processor is the entry point for a dynamic assessments framework. As an example, a trigger may be output by a scheduler for initiating static audit requests, whereby the same assessment, or set of assessments, are to be performed every scheduled time and/or when a partner does not care to filter the list of enterprises and nodes to be assessed for each subsequent assessment. For static audit requests, the assessment parameters, such as the list of enterprises and the list of nodes to assess and the list of analyzers to be run, does not change over time (e.g., no new enterprises are added and no existing enterprises are deleted), and this information is obtained from the audit request database 2985 and the policy database 2988. Of course, the data being provided from the HAO collectors to the analyzers executed during an assessment may change for each subsequent execution of the same assessment.

Provided below is one possible command line interface code for batch processing, whereby the code is shown in XML format:

batch.sh batchXmlDescriptorID1.xml [batchXmlDescriptorID2.xml . . . ]

By using batch descriptors in XML code that correspond to task definitions in the second embodiment, this provides an easy way to interface with the partner batch processor 2910 without having to create complex code to interface with the framework batch processor 2975. The XML descriptor IDs in the command line interface code provided above are a list of IDs identifying the static audit requests for which to run the assessments. These correspond to the .xml file names stored in the audit request database 2985 and policy database 2988 that are accessible by the framework batch processor 2975. The framework batch processor 2975 executes the command line, reads the files specified in the command line from the corresponding database(s), and thus reads in an audit request and a policy that together define an assessment, whereby they are then processed against the specified data previously gathered from the field into the tracker data base 106.

By way of the interface to the partner batch processor 2910, one can dynamically: 1) create enterprise and system lists, 2) create analyzer lists, 3) create completed audit requests, and 4) create a batch process that implements an audit request. The audit requests can either be kept in temporary files or they may already be in document form. The framework batch processor 2975 will then set up the requested environment to complete the assessment, by obtaining any appropriate policy referenced by an assessment task or audit request and its correct definition.

By way of the invention according to the second embodiment, an assessment can be run from a trigger, and an assessment can be proactive or reactive in nature, depending upon the triggering event. Also, any subset of an assessment, or the full assessment, can be run at any time and can be initiated by any partner trigger. Further, the assessment framework manages the control flow of the assessment execution, while the partner manages the input data specifying the audit request. The second embodiment thus extends the framework so that other processes besides a user interface can generate an assessment, and it also sets up add-on functionality for later inclusion, such as scheduling batch assessments to run as well as subscribing to receive automatically generated reports.

One example of the usage of a system according to the second embodiment is an on-line computer support specialist. Such a support specialist can trigger a reactive assessment using the partner batch processor 2910, and can choose either to run an entire assessment or to run a subset of an assessment, in order to determine a solution to a particular problem being experienced by a remote computer user. Furthermore, it may not be an actual person that triggers the assessment, but rather an event-detection system that can be altered to an event and then trigger an assessment, or an appropriate subset of an assessment. In all of these cases, one interface to an assessments framework is all that is required.

Figure 30:
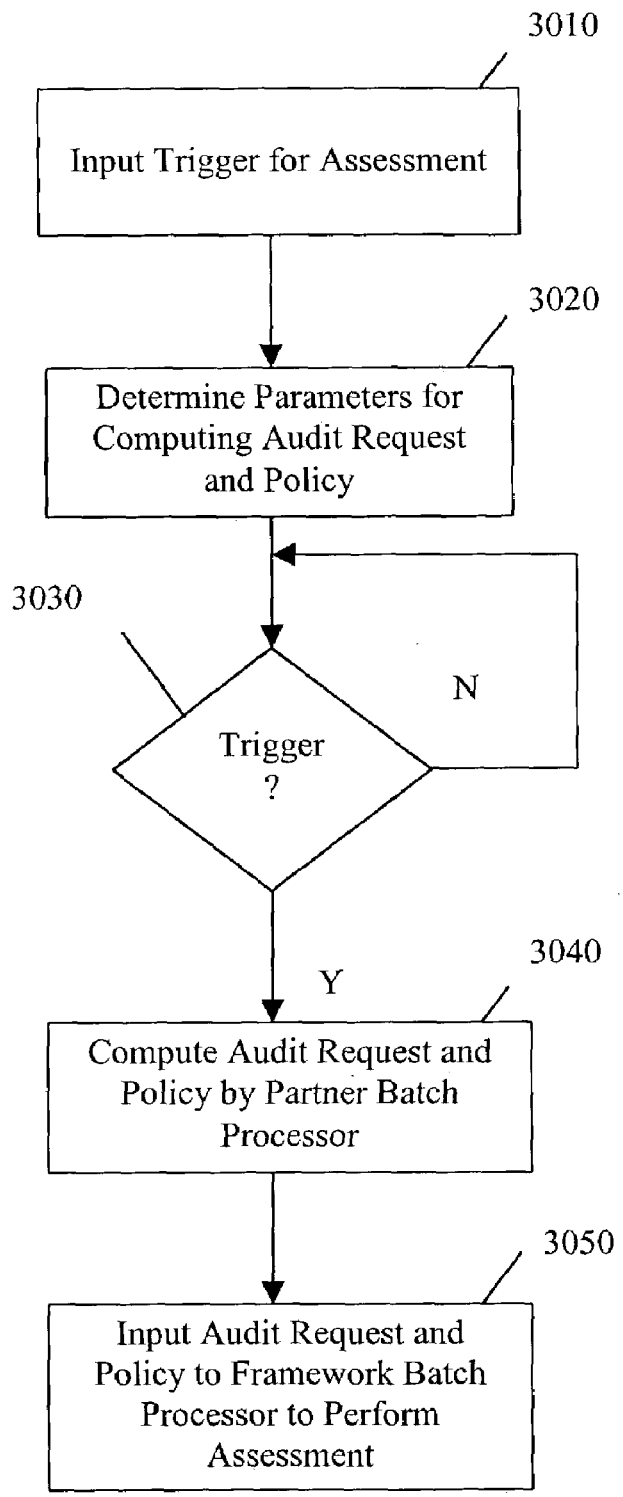
FIG. 30 illustrates a sequence of steps in creating a dynamic assessment by a partner in accordance with the second embodiment.

FIG. 30 shows a sequence of steps for creating and performing a partner-initiated assessment in accordance with the second embodiment. In a step 3010, the partner 2905 inputs information to the partner batch processor 2910 regarding any triggers that are to cause the assessment to be run. In a step 3020, the partner 2905 inputs information to the partner batch processor 2910 regarding parameters for computing an audit request and any assessment policy referenced by the audit request. For example, the partner 2905 may choose to perform an assessment for only a particular type of node or nodes, or for nodes that that have a particular piece of hardware or software loaded thereon. At a step 3030, it is determined whether or not the trigger has occurred. If it has not occurred, then nothing is done (the system continues to wait for a triggering event). If the trigger has occurred, then at a step 3040 the partner batch processor 2920 computes the necessary audit request and any assessment policy referenced by the audit request. At a step 3050, the partner-computed audit request and assessment policy are received by the framework batch processor 2975, and the framework batch processor 2975 performs the partner-initiated assessment using that information (and the collected information from the Tracker Database 106).

Dynamic and Flexible Policies for Assessment Execution

An assessment is dynamically generated in the second embodiment as a combination of an assessment policy with an audit request (also called "assessment task" 814 as shown in FIG. 8). A "policy" is a particular sequence of data services (or steps) that is to be performed when an assessment task (or audit request) is defined with reference to the policy. This set of data services (or steps) is what the assessment framework performs in order to manage the generation of an assessment based on an assessment task (however the assessment task may be triggered).

The use of a policy in defining an assessment task provides great flexibility in the definition of an assessment task. For example, a particular policy may be reused between different assessment tasks, or different policies may be easily created so that the sequence of data services (as well as the particular processing carried out by each data service) can be easily customized without requiring significant recompilation of the components of the assessment framework (for example, the analyzers within the analyzer database 804). Some of the benefits of using dynamic policies in defining assessment tasks include: (1) the ability to add data services and policies without recompilation; (2) the ability to tailor or customize the processing of a particular data service; and (3) the tying or associating of a particular policy to a particular assessment type.

By way of example, FIG. 31 shows an exemplary policy 3101 "techasmts" that is defined by an XML descriptor file. It should be recognized that FIG. 31 is exemplary only and all variations, alternatives, and equivalents are considered a part of the present invention. In fact, one skilled in the art would recognize that the definition of a policy can be stored using any database storage technique or protocol instead of the disclosed XML format herein. One skilled in the art would recognize that such a policy could be created by using a policy definition unit (not shown) that comprises any application development tool that provides a user interface that supports the definition and capture of a policy. Likewise, a policy can be stored in any database, such as the policy database 2988 shown in FIG. 29.

The policy 3101 includes two data services (each tagged with or surrounded by a "<data-service> . . . </data-service>" XML tag)—(1) an audit data service implemented using the "Audit" class, and (2) a data reporter data service using the "DataReporter" class. These two data services are similar to assessment tasks steps discussed in both the first and second embodiments wherein the Audit data service invokes the assessment framework to run the list of analyzers defined, or referred to, in an assessment task (or audit request). The Data Reporter data service invokes the assessment framework to generate the reports that are also defined, or referred to, in the assessment task (see, for example, the assessment task defined at 2502 in FIG. 25).

Therefore, a policy is made up of a sequence of one or more data services. Each data service is implemented by a particular class that is dynamically instantiated. When the class is instantiated, its constructor is called with a set of properties (for example, java.util.properties) that are associated with that data service in the policy as shown associated with the <properties> tags in the policy 3101. For example, in the policy 3101 "techasmts" (stored in a XML description file) shown in FIG. 31, the Data Reporter data service is associated with a property named "xsl-script" (see <xsl-script> tag) that is associated with a XSLT script which can be used to customize or tailor the data report in a flexible manner. The properties are (name:value) pairs that can be used to customize or tailor the processing of a particular data service by associating customized properties with the particular data service.

In the policy 3101, the Data Reporter data service is associated with an XSLT script by using the properties feature of a policy that allows zero or more properties to be associated with a data service. An XSLT transformation defines a transformation that essentially consists of converting an XML "source tree" into a new—and usually completely different—"result tree". This may be accomplished by way of an XSLT style sheet, which contains one or more template rules. A template rule performs two functions: it first identifies a pattern to match in the source tree, and then it describes the structure of the desired result tree. Therefore, any user can associate their own customized XSLT style sheet with the Data Reporter data service in a policy so that customized reports can be easily generated without requiring recompilation or regeneration of the Data Reporter class. That is, to allow for this flexibility, the Data Reporter data service is modified to take the xsl-script property passed to it and to use it to identify a specific XSL script which it then uses to transform its incoming document, thereby customizing the document in accordance with the policy. In this way, the compiled products reporting capabilities can be flexibly expanded by simply creating a new XSLT script and associating the new XSLT script with the Data Reporter data service using the properties feature of the assessment policy.

When defining an assessment task (or audit request), an assessment type may be used so that a specific list of analyzers (or other processing component) can be associated with the assessment task without enumerating each of the analyzers. For example, as shown in FIG. 32, an assessment type 3201 "HP-UX Hardware/Operating System" includes a list of analyzers specified by the <analysis-set> tag. Furthermore, this assessment type also includes a <policy> tag that associates the assessment with a policy so that the sequence of data services in an assessment task can be specified by referring to an assessment type which is associated with a policy. It should be recognized that the XML descriptor file in FIG. 32 is exemplary only; and all modifications, variations, and equivalents are considered to be a part of the present invention. In addition, one skilled in the art would recognize that the assessment task definition itself could directly incorporate or refer to a policy without necessarily requiring an assessment type correlated to a policy. An assessment task may be defined in an assessment task definition unit (not shown) that provides a user interface for defining the assessment task such as that used by the auditor 813 in defining the assessment tasks 814 and 816 in FIG. 8.

Using these features, the partners may be able to extend the assessment framework without requiring any recompilation. Partners can also create that their own customized control flow since they can specify the sequence of the data services (in addition to specifying the data services) in the assessment policy. By using the XSLT stylesheets, as discussed above, the reporting can be enhanced dynamically or "on-the-fly." Furthermore, each assessment type can have its own control flow by pointing (or being correlated) to customized policies. These advantages are significant since partners are not limited to a preprogrammed control flow in the assessment framework since the policies can be used to customize the control flow of the assessment framework (i.e., specify which data services are performed and in what sequence).

FIG. 33 shows another exemplary policy 3301 which includes multiple data services. It should be recognized that FIG. 33 is exemplary only, and one skilled in the art would recognize various alternatives, modifications, and equivalents all which are considered to be a part of the present invention. In addition to the Audit data service and the ReportDataSink data service (which is similar to the Data Reporter data service), the policy 3301 includes a sequence of several other data services. An ObservationDataService data service processes the output of the Audit Data service (which, for example, is written to the Issues Database 112 shown in FIG. 8) to make observations (for example, based on patterns of failures of nodes or components). The SummaryDataService summarizes the observation data for better analysis while the SystemElementsInfoDataService tabulates issues across systems for metrics. Therefore, the policy 3301 provides an example where the data services (and their sequence) can be flexibly defined so that the control flow of an assessment can be flexibly defined.

The foregoing description of several embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An assessments framework for assessing configuration information for software and hardware infrastructure in a computer system, comprising:
   a framework batch computer-implemented processor that is configured to perform either a static assessment or a dynamic assessment based on an assessments policy and an assessments task definition for the infrastructure in the computer system;
   a partner batch computer-implemented processor that is configured to create a dynamic task definition and a dynamic assessments policy for an assessment created by a partner, wherein the framework batch processor either retrieves the policy and the task definition from a computer accessible database when executing an assessment not created by the partner, or receives the policy and the task definition output from the partner batch processor when executing the assessment created by the partner.

2. The assessments framework according to claim 1, further comprising:
   a computer-implemented trigger interface unit that provides triggering information to the framework batch processor and to the partner batch processor.

3. The assessments framework according to claim 2, further comprising:
   a computer-implemented scheduler for providing information as to whether or not a time-based trigger has occurred; and
   a computer-implemented event determination unit for providing information as to whether or not an event-based trigger has occurred.

4. The assessments framework according to claim 1, further comprising:
   a computer-accessible policy database for storing at least one policy corresponding to at least one assessment; and
   a computer-accessible task definition database for storing at least one task definition corresponding to at least one assessment.

5. The assessments framework according to claim 1, further comprising:
   a computer-accessible tracker database for storing current information on at least one of an enterprise and a node, wherein information from the tracker database is utilized in order to create the dynamic task definition.

6. A method of performing an assessment of configuration information for software and hardware infrastructure in a computer system, comprising:
   receiving a triggering event;
   based on the triggering event, determining whether or not a static assessment or a dynamic assessment is to be performed for the infrastructure in the computer system;
   if the static assessment is to be performed, utilizing a framework batch computer-implemented processor that retrieves static policy information and static task definition information for executing the static assessment; and
   if the dynamic assessment is to be performed, utilizing a partner batch computer-implemented processor to provide dynamic policy information and dynamic task definition information, and then providing the dynamic policy information and the dynamic task definition information to the framework batch processor for executing the dynamic assessment.

7. The method according to claim 6, further comprising: outputting at least one report based on the policy information for the assessment.

8. The method according to claim 7, wherein the trigger is one of a schedule-based trigger and an event-based trigger.

9. The method according to claim 8, wherein the event-based trigger is output when a particular event is detected at a particular node of a particular enterprise.

10. A computer program product encoded on a computer readable medium and comprising code that, when executed on a computer-implemented processor performs a method for assessing configuration information for software and hardware infrastructure in a computer system, the method comprising:
- determining whether or not a triggering event has occurred;
- based on notification of the triggering event,
  - determining whether or not a static assessment or a dynamic assessment of the infrastructure is to be performed;
- based on notification that the static assessment is to be performed,
  - controlling a framework batch processor in order to retrieve static policy information and static task definition information for executing the static assessment; and
- based on notification that the dynamic assessment is to be performed,
  - controlling a partner batch computer-implemented processor to provide dynamic policy information and dynamic task definition information, and
  - then providing the dynamic policy information and the dynamic task definition information to the framework batch computer-implemented processor for executing the dynamic assessment.

11. The computer program product according to claim 10, wherein the method further comprises: outputting at least one report based on the policy information for the assessment.

12. The computer program product according to claim 10, wherein the trigger is one of a schedule-based trigger and an event-based trigger.

13. The computer program product according to claim 12, wherein the event-based trigger is output when a particular event is detected at a particular node of a particular enterprise.

14. An assessments framework for assessing configuration information for software and hardware infrastructure in a computer system, comprising:
- first computer-implemented processing means for performing either a static assessment or a dynamic assessment for the infrastructure in the computer system based on an assessments policy and an assessments task definition;
- second computer-implemented processing means for creating a dynamic task definition and a dynamic assessments policy for an assessment created by a partner; and
- computer-accessible storage means for storing at least one assessments policy and at least one assessments task definition not created by the second processing means, wherein the first processing means either retrieves the assessments policy and the assessments task definition from the storage means when executing an assessment not created by the partner, or receives the assessment policy and the assessments task definition output from the second processing means when executing the assessment created by the partner.

15. The assessments framework according to claim 14, further comprising:
- computer-implemented trigger interface means for providing triggering information to the first and second processing means.

16. The assessments framework according to claim 15, further comprising:
- computer-implemented scheduling means for providing information as to whether or not a time-based trigger has occurred; and
- computer-implemented event determining means for providing information as to whether or not an event-based trigger has occurred.

17. The assessments framework according to claim 14, further comprising:
- computer-accessible policy database means for storing at least one policy corresponding to at least one assessment; and
- computer-accessible task definition database means for storing at least one task definition corresponding to at least one assessment.

18. The assessments framework according to claim 14, further comprising:
- computer-accessible tracker database means for storing current information on at least one of an enterprise and a node, wherein information from the tracker database means is utilized in order to create the dynamic task definition.

* * * * *